(12) United States Patent
Ying et al.

(10) Patent No.: US 12,015,484 B2
(45) Date of Patent: Jun. 18, 2024

(54) USER EQUIPMENTS, BASE STATIONS AND METHODS FOR REDUNDANCY VERSION DETERMINATION ON MINI-SLOT PUSCH

(71) Applicant: SHARP KABUSHIKI KAISHA, Sakai (JP)

(72) Inventors: Kai Ying, Vancouver, WA (US); Kazunari Yokomakura, Sakai (JP); Tatsushi Aiba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 417 days.

(21) Appl. No.: 17/608,129

(22) PCT Filed: Apr. 21, 2020

(86) PCT No.: PCT/JP2020/017248
§ 371 (c)(1),
(2) Date: Nov. 1, 2021

(87) PCT Pub. No.: WO2020/222299
PCT Pub. Date: Nov. 5, 2020

(65) Prior Publication Data
US 2022/0231789 A1    Jul. 21, 2022

Related U.S. Application Data

(60) Provisional application No. 62/842,157, filed on May 2, 2019.

(51) Int. Cl.
*H04B 7/00*     (2006.01)
*H04L 1/08*     (2006.01)
(Continued)

(52) U.S. Cl.
CPC ........... *H04L 1/08* (2013.01); *H04W 72/0446* (2013.01); *H04W 72/1268* (2013.01); *H04W 72/23* (2023.01)

(58) Field of Classification Search
None
See application file for complete search history.

(56) References Cited

U.S. PATENT DOCUMENTS 11,139,930 B2 *   10/2021   Wang ..................... H04W 72/23
11,223,452 B2 *    1/2022   Oh ......................... H04L 1/189
(Continued)

OTHER PUBLICATIONS

3GPP TR 38.824 V2.0.0 (Mar. 2019), 3rd Generation Partnership Project; Technical Specification Group Radio Access Network; Study on physical layer enhancements for NR ultra-reliable and low latency case (URLLC) (Release 16).

(Continued)

*Primary Examiner* — Sithu Ko
(74) *Attorney, Agent, or Firm* — ScienBiziP, P.C.

(57) ABSTRACT

A user equipment (UE) is described. The UE includes receiving circuitry configured to receive resource allocation information of a mini-slot physical uplink shared channel (PUSCH) and a number of repetitions for the PUSCH. The UE also includes control circuitry configured to determine a redundancy version (RV) for the number of repetitions. The UE further includes transmission circuitry configured to transmit the number of repetitions for the PUSCH based on the determined RV.

3 Claims, 17 Drawing Sheets

(51) Int. Cl.
*H04L 5/00* (2006.01)
*H04W 72/0446* (2023.01)
*H04W 72/1268* (2023.01)
*H04W 72/23* (2023.01)

(56) References Cited

U.S. PATENT DOCUMENTS

| | | | | |
|---|---|---|---|---|
| 11,588,523 | B2* | 2/2023 | Khoshnevisan | H04L 5/0091 |
| 11,641,646 | B2* | 5/2023 | Bagheri | H04W 72/1268 |
| | | | | 370/330 |
| 11,659,551 | B2* | 5/2023 | Cao | H04W 72/02 |
| | | | | 370/330 |
| 11,700,613 | B2* | 7/2023 | Takeda | H04L 1/1864 |
| | | | | 370/329 |
| 2021/0219333 | A1* | 7/2021 | Xu | H04W 72/0453 |
| 2022/0132533 | A1* | 4/2022 | Taherzadeh Boroujeni | |
| | | | | H04W 72/1268 |
| 2022/0132555 | A1* | 4/2022 | Blankenship | H04W 72/23 |
| 2022/0231789 | A1* | 7/2022 | Ying | H04L 5/0053 |

OTHER PUBLICATIONS

3GPP TS 38.331 V15.5.1 (Apr. 2019), 3rd Generation Partnership Project; Technical Specification Group Radio Access Network; NR; Radio Resource Control (RRC) protocol specification (Release 15).
3GPP TS 38.211 V15.5.0 (Mar. 2019), 3rd Generation Partnership Project; Technical Specification Group Radio Access Network; NR; Physical channels and modulation (Release 15).
3GPP TS 38.212 V15.5.0 (Mar. 2019), 3rd Generation Partnership Project; Technical Specification Group Radio Access Network; NR; Multiplexing and channel coding (Release 15).
3GPP TS 38.214 V15.5.0 (Mar. 2019), 3rd Generation Partnership Project; Technical Specification Group Radio Access Network; NR; Physical layer procedures for data (Release 15).
3GPP TS 38.213 V15.5.0 (Mar. 2019), 3rd Generation Partnership Project; Technical Specification Group Radio Access Network; NR; Physical layer procedures for control (Release 15).
NTT Docomo, Inc., "Pusch enhancements for URLLC", R1-1904959, 3GPP TSG-RAN WG1 #96bis, Xi'an, China, Apr. 8-Apr. 12, 2019.
China Unicom, "PUSCH enhancements for URLLC", R1-1906631, 3GPP TSG RAN WG1 #97, Reno, USA, May 13-17, 2019.

* cited by examiner

Supported Transmission Numerologies 201

| $\mu$ | $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot 203

| | | Slot configuration | | | | |
|---|---|---|---|---|---|---|
| | | 0 | | | 1 | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

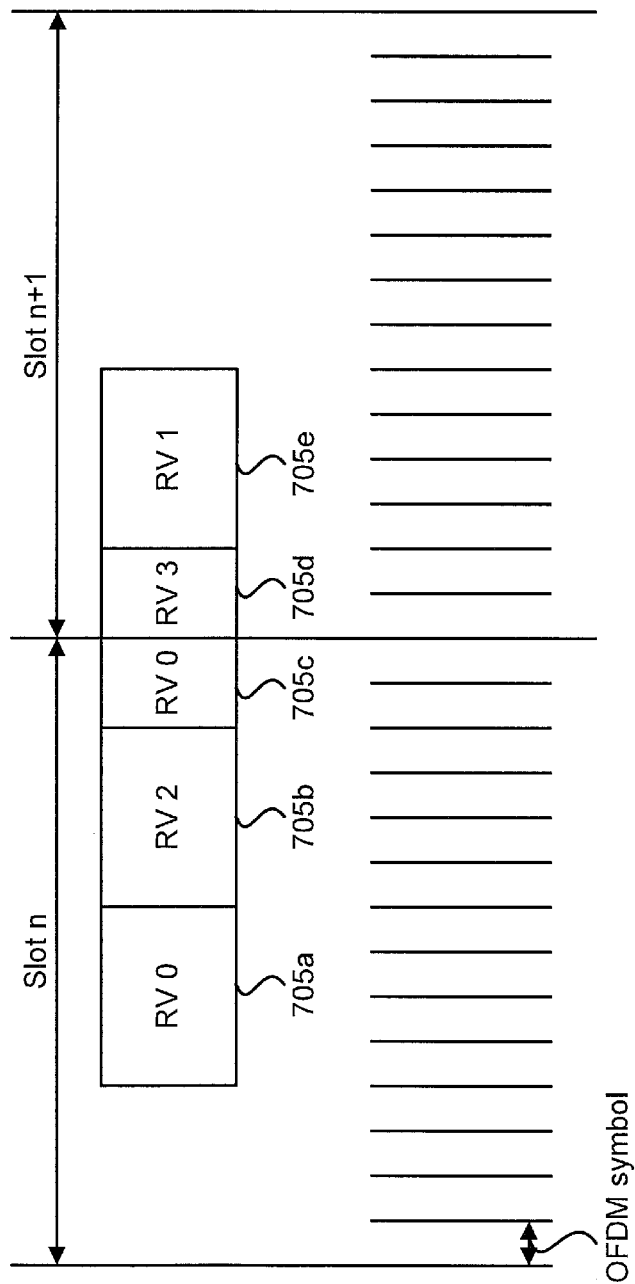

USER EQUIPMENTS, BASE STATIONS AND METHODS FOR REDUNDANCY VERSION DETERMINATION ON MINI-SLOT PUSCH

CROSS REFERENCE

This Nonprovisional application claims priority under 35 U.S.C. § 119 on provisional Application No. 62/842,157 on May 2, 2019, the entire contents of which are hereby incorporated by reference.

TECHNICAL FIELD

The present disclosure relates generally to communication systems. More specifically, the present disclosure relates to new signaling, procedures, user equipment (UE) and base stations for configuration for user equipments, base stations and methods for redundancy version determination on mini-slot physical uplink shared channel (PUSCH).

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) that communicates with a base station comprising: receiving circuitry configured to: receive a Radio Resource Control (RRC) message including first information indicating a first redundancy version (RV) sequence for first configured grant (CG) Physical Uplink Shared Channel (PUSCH) transmissions, receive a RRC message including second information indicating a second RV sequence for second CG PUSCH transmissions, transmitting circuitry configured to: perform repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, perform repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

In one example, a base station apparatus that communicates with a user equipment (UE) comprising: transmitting circuitry configured to: transmit a Radio Resource Control (RRC) message including first information indicating a first redundancy version (RV) sequence for first configured grant (CG) Physical Uplink Shared Channel (PUSCH) transmissions, transmit a RRC message including second information indicating a second RV sequence for second CG PUSCH transmissions, receiving circuitry configured to: receive repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, receive repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

In one example, a communication method of a user equipment comprising: receiving a Radio Resource Control (RRC) message including first information indicating a first redundancy version (RV) sequence for first configured grant (CG) Physical Uplink Shared Channel (PUSCH) transmissions, receiving a RRC message including second information indicating a second RV sequence for second CG PUSCH transmissions, transmitting circuitry configured to: performing repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, performing repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

In one example, a communication method of a base station apparatus comprising: transmitting a Radio Resource Control (RRC) message including first information indicating a first redundancy version (RV) sequence for first configured grant (CG) Physical Uplink Shared Channel (PUSCH) transmissions, transmitting a RRC message including second information indicating a second RV sequence for second CG PUSCH transmissions, receiving circuitry configured to: receiving repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, receiving repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

BRIEF DESCRIPTION OF DRAWINGS

FIG. 2 shows examples of multiple numerologies.

FIG. 7C illustrates yet another example of RV determination for split transmission occasions.

DESCRIPTION OF EMBODIMENTS

Figure 1:
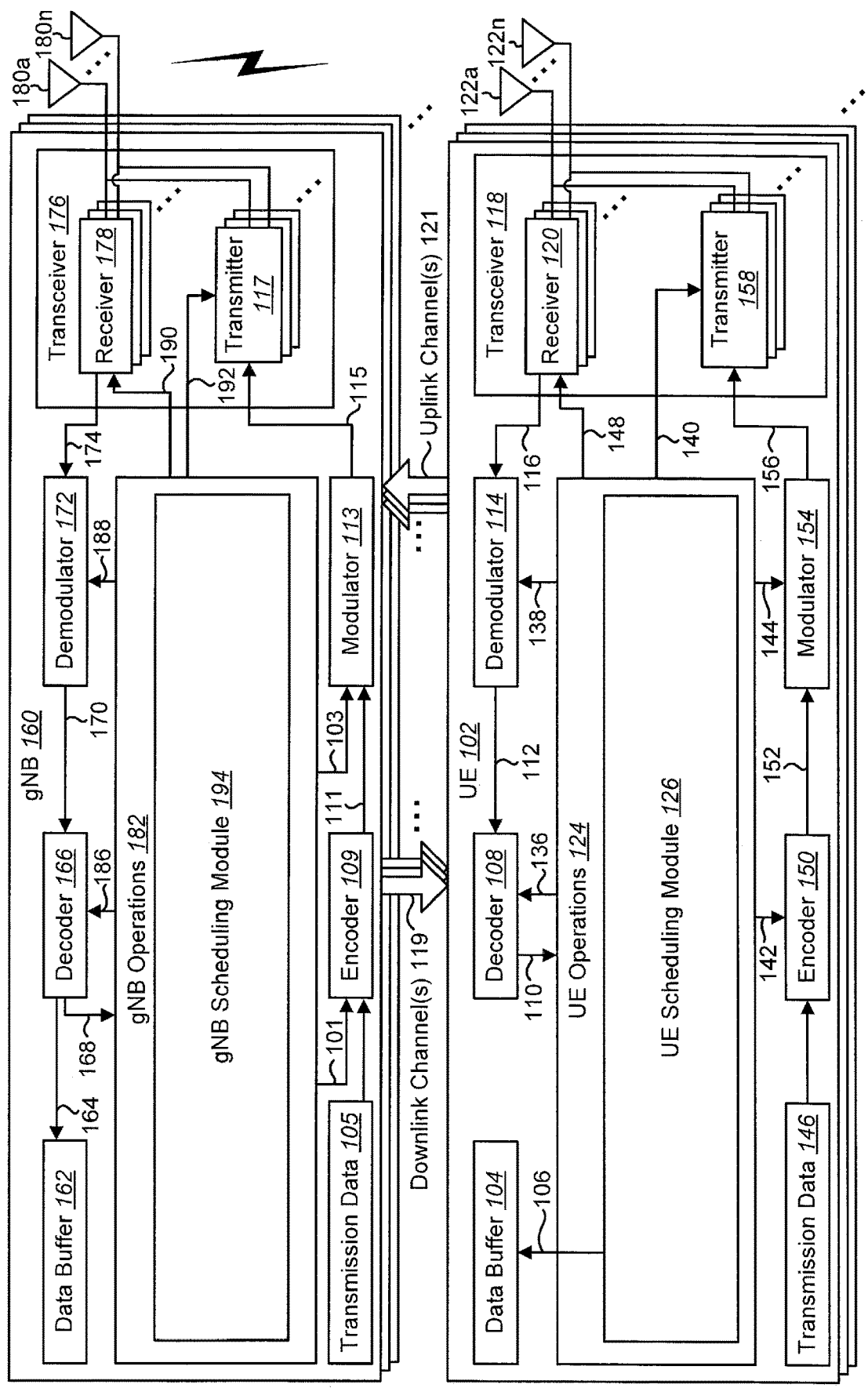
FIG. 1 is a block diagram illustrating one implementation of one or more base station apparatuses (gNBs) and one or more user equipments (UEs) in which systems and methods for signaling may be implemented.

A user equipment (UE) is described. The UE includes receiving circuitry configured to receive resource allocation information of a mini-slot physical uplink shared channel (PUSCH) and a number of repetitions for the PUSCH. The UE also includes control circuitry configured to determine a redundancy version (RV) for the number of repetitions. The UE further includes transmission circuitry configured to transmit the number of repetitions for the PUSCH based on the determined RV.

In an approach, an RV sequence may be applied to all transmission occasions of the number of repetitions including split transmission occasions. In another approach, a split transmission occasion may use a different RV pattern than non-split transmission occasions.

A base station apparatus is also described. The base station apparatus includes transmission circuitry configured to transmit resource allocation information of a minislot PUSCH and a number of repetitions for the PUSCH. The base station apparatus also includes control circuitry configured to determine an RV for the number of repetitions for the PUSCH. The base station apparatus further includes receiving circuitry configured to receive the number of repetitions for the PUSCH based on the determined RV.

A communication method of a user equipment is also described. The method includes receiving resource allocation information of a mini-slot PUSCH and a number of repetitions for the PUSCH. The method also includes determining an RV for the number of repetitions for the PUSCH. The method further includes transmitting the number of repetitions for the PUSCH based on the determined RV.

A communication method of a base station apparatus is also described. The method includes transmitting resource allocation information of a mini-slot PUSCH and a number of repetitions for the PUSCH. The method also includes determining an RV for the number of repetitions for the PUSCH. The method further includes receiving the number of repetitions for the PUSCH based on the determined RV.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In de-scribing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. And, in NR, transmissions for different services may be specified (e.g., configured) for one or more bandwidth parts (BWPs) in a serving cell and/or for one or more serving cells. A user equipment (UE) may receive a downlink signal(s) and/or transmit an uplink signal(s) in the BWP(s) of the serving cell and/or the serving cell(s).

In order for the services to use the time, frequency, and/or space resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

UCI for URLLC needs higher reliability and lower latency than eMBB. In one aspect, the described systems and methods can achieve the lower latency in mini-slot repetition by using the earliest DMRS satisfying the timing equal to or greater than the indicated timing in repeated PUSCH. In another aspect, the described systems and methods, can achieve the higher reliability by using multiple parameters for UCI multiplexing on PUSCH.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for signaling may be implemented. The one or more UEs 102 communicate with one or more gNBs 160 using one or more physical antennas 122*a-n*. For example, a UE 102 transmits electromagnetic signals to the gNB 160 and receives electromagnetic signals from the gNB 160 using the one or more physical antennas 122*a-n*. The gNB 160 communicates with the UE 102 using one or more physical antennas 180*a-n*. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDCCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink physical shared channel (PSCH) (e.g., PUCCH) resource).

In another example, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, a physical downlink control channel (PDCCH) may be defined. The PDCCH may be used for transmitting downlink control information (DCI). Here, more than one DCI formats may be defined for DCI transmission on the PDCCH. Namely, fields may be defined in the DCI format(s), and the fields are mapped to the information bits (e.g., DCI bits).

For example, a DCI format 1_0 that is used for scheduling of the PDSCH in the cell may be defined as the DCI format for the downlink. Also, as described herein one or more Radio Network Temporary Identifiers (e.g., the Cell RNTI(s) (C-RNTI(s)), the Configured Scheduling RNTI(s) (CS-RNTI(s)), the System Information RNTI(s) (SI-RNTI(s)), the Random Access RNTI(s) (RA-RNTI(s)), and/or a first RNTI may be used to transmit the DCI format 1_O. Also, the DCI format 1_0 may be monitored (e.g., transmitted, mapped) in the Common Search Space (CSS) and/or the UE Specific Search space (USS). Alternatively, the DCI format 1_0 may be monitored (e.g., transmitted, mapped) in the CSS only.

For example, the DCI included in the DCI format 1_0 may be a frequency domain resource assignment (e.g., for the PDSCH). Additionally or alternatively, the DCI included in the DCI format 1_0 may be a time domain resource assignment (e.g., for the PDSCH). Additionally or alternatively, the DCI included in the DCI format 1_0 may be a modulation and coding scheme (e.g., for the PDSCH). Additionally or alternatively, or alternatively, the DCI included in the DCI format 1_0 may be a new data indicator. Additionally or alternatively, the DCI included in the DCI format 1_0 may be a TPC (e.g., Transmission Power Control) command for scheduled PUCCH. Additionally or alternatively, the DCI included in the DCI format 1_0 may be a PUCCH resource indicator. Additionally or alternatively, the DCI included in the DCI format 1_0 may be a PDSCH-to-HARQ feedback timing indicator. Additionally or alternatively, the DCI included in the DCI format 1_0 may be a priority indication (e.g., for the PDSCH transmission and/or the PDSCH reception). Additionally or alternatively, the DCI included in the DCI format 1_0 may be the priority indication (e.g., for the HARQ-ACK transmission for the PDSCH and/or the HARQ-ACK reception for the PDSCH).

Here, the priority indication may be used for indicating a priority (e.g., 2-bit information, 00: the lowest priority, 01: the lower priority, 10: the higher priority, and/or 11: the highest priority) for the PDSCH transmission and/or the PDSCH reception. For example, in a case that the UE 102 detects (e.g., decode, receive) the DCI format for the downlink including the priority indication, the UE 102 may identify the PDSCH transmission and/or the PDSCH reception is prioritized (e.g., the PDSCH transmission and/or the PDSCH reception has the higher priority, the highest priority, the lower priority, and/or the lowest priority).

Additionally or alternatively, the priority indication may be used for indicating a priority (e.g., 2-bit information, 00: the lowest priority, 01: the lower priority, 10: the higher priority, and/or 11: the highest priority) for the HARQ-ACK transmission for the PDSCH and/or the HARQ-ACK reception for the PDSCH. For example, in a case that the UE 102 detects the DCI format for the downlink including the priority indication, the UE 102 may identify the HARQ-ACK transmission for the PDSCH and/or the HARQ-ACK reception for the PDSCH is prioritized (e.g., the HARQ-ACK transmission for the PDSCH and/or the HARQ-ACK reception for the PDSCH has the higher priority, the highest priority, the lower priority, and/or the lowest priority).

Additionally or alternatively, a DCI format 1_1 that is used for scheduling of the PDSCH in the cell may be defined as the DCI format for the downlink. Additionally or alternatively, the C-RNTI, the CS-RNTI, and/or the first RNTI may be used to transmit the DCI format 1_1. Additionally or alternatively, the DCI format 1_1 may be monitored (e.g., transmitted and/or mapped) in the CSS and/or the USS.

For example, the DCI included in the DCI format 1_1 may be a BWP indicator (e.g., for the PDSCH). Additionally or alternatively, the DCI included in the DCI format 1_1 may be frequency domain resource assignment (e.g., for the PDSCH). Additionally or alternatively, the DCI included in the DCI format 1_1 may be a time domain resource assignment (e.g., for the PDSCH). Additionally or alternatively, the DCI included in the DCI format 1_1 may be a modulation and coding scheme (e.g., for the PDSCH). Additionally or alternatively, the DCI included in the DCI format 1_1 may be a new data indicator. Additionally or alternatively, the DCI included in the DCI format 1_1 may be a TPC command for scheduled PUCCH. Additionally or alternatively, the DCI included in the DCI format 1_1 may be a CSI request that is used for requesting (e.g., triggering) transmission of the CSI (e.g., CSI reporting (e.g., aperiodic CSI reporting)). Additionally or alternatively, the DCI included in the DCI format 1_1 may be a PUCCH resource indicator. Additionally or alternatively, the DCI included in the DCI format 1_1 may be a PDSCH-to-HARQ feedback timing indicator. Additionally or alternatively, the DCI included in the DCI format 1_1 may be the priority indication (e.g., for the PDSCH transmission and/or the PDSCH reception). Additionally or alternatively, the DCI included in the DCI format 1_1 may be the priority indication (e.g., for the HARQ-ACK transmission for the PDSCH and/or the HARQ-ACK reception for the PDSCH).

Additionally or alternatively, a DCI format 1_X that is used for scheduling of the PDSCH in the cell may be defined as the DCI format for the downlink. Additionally or alternatively, the C-RNTI, the CS-RNTI, and/or the first RNTI may be used to transmit the DCI format 1_X. Additionally or alternatively, the DCI format 1_X may be monitored (e.g., transmitted and/or mapped) in the CSS and/or the USS.

For example, the DCI included in the DCI format 1_X may be a BWP indicator (e.g., for the PDSCH). Additionally or alternatively, the DCI included in the DCI format 1_X may be frequency domain resource assignment (e.g., for the PDSCH). Additionally or alternatively, the DCI included in the DCI format 1_X may be a time domain resource assignment (e.g., for the PDSCH). Additionally or alternatively, the DCI included in the DCI format 1_X may be a modulation and coding scheme (e.g., for the PDSCH). Additionally or alternatively, the DCI included in the DCI format 1_X may be a new data indicator. Additionally or alternatively, the DCI included in the DCI format 1_X may be a TPC command for scheduled PUCCH. Additionally or alternatively, the DCI included in the DCI format 1_X may be a CSI request that is used for requesting (e.g., triggering) transmission of the CSI (e.g., CSI reporting (e.g., aperiodic CSI reporting)). Additionally or alternatively, the DCI included in the DCI format 1_X may be a PUCCH resource indicator. Additionally or alternatively, the DCI included in the DCI format 1_X may be a PDSCH-to-HARQ feedback timing indicator. Additionally or alternatively, the DCI included in the DCI format 1_X may be the priority indication (e.g., for the PDSCH transmission and/or the PDSCH reception). Additionally or alternatively, the DCI included in the DCI format 1_X may be the priority indication (e.g., for the HARQ-ACK transmission for the PDSCH and/or the HARQ-ACK reception for the PDSCH).

Here, the DCI format 1_X (and/or the DCI format 1_X including the priority indication) may be used for indicating a priority (e.g., the higher priority, the highest priority, the lower priority, and/or the lowest priority) for the PDSCH transmission and/or the PDSCH reception. For example, in a case that the UE 102 detects the DCI format 1_X (and/or the DCI format 1_X including the priority indication), the UE 102 may identify the PDSCH transmission and/or the PDSCH reception is prioritized (e.g., the PDSCH transmission and/or the PDSCH reception has the higher priority, the highest priority, the lower priority, and/or the lowest priority).

Additionally or alternatively, the DCI format 1_X (and/or the DCI format 1_X including the priority indication, and/or the DCI format 1_X with the CRC scrambled by the first RNTI, and/or the DCI format 1_X with the CRC scrambled by the first RNTI including the priority indication) may be used for indicating a priority (e.g., the higher priority, the highest priority, the lower priority, and/or the lowest priority) for the HARQ-ACK transmission for the PDSCH and/or the HARQ-ACK reception for the PDSCH. For example, in a case that the UE 102 detects the DCI format 1_X (and/or the DCI format 1_X including the priority indication, and/or the DCI format 1_X with the CRC scrambled by the first RNTI, and/or the DCI format 1_X with the CRC scrambled by the first RNTI including the priority indication), the UE 102 may identify the HARQ-ACK transmission for the PDSCH and/or the HARQ-ACK reception for the PDSCH is prioritized (e.g., the HARQ-ACK transmission for the PDSCH and/or the HARQ-ACK reception for the PDSCH has the higher priority, the highest priority, the lower priority, and/or the lowest priority).

Additionally or alternatively, a DCI format 0_0 that is used for scheduling of the PUSCH in the cell may be defined as the DCI format for the uplink. Additionally or alternatively, the C-RNTI, the CS-RNTI, the Temporary C-RNTI, and/or the first RNTI may be used to transmit the DCI format 0_0. Additionally or alternatively, the DCI format 0_0 may be monitored (e.g., transmitted, mapped) in the CSS and/or the USS. Alternatively, the DCI format 0_0 may be monitored (e.g., transmitted, mapped) in the CSS only.

For example, the DCI included in the DCI format 0_0 may be a frequency domain resource assignment (e.g., for the PUSCH). Additionally or alternatively, the DCI included in the DCI format 0_0 may be a time domain resource assignment (e.g., for the PUSCH). Additionally or alternatively, the DCI included in the DCI format 0_0 may be a modulation and coding scheme (e.g., for the PUSCH). Additionally or alternatively, the DCI included in the DCI format 0_0 may be a new data indicator. Additionally or alternatively, the DCI included in the DCI format 0_0 may be a redundancy version. Additionally or alternatively, the DCI included in the DCI format 0_0 may be a TPC command for scheduled PUSCH. Additionally or alternatively, the DCI included in the DCI format 0_0 may be the priority indication (e.g., for the PUSCH transmission and/or for the PUSCH reception).

Here, the priority indication may be used for indicating a priority (e.g., 2-bit information, 00: the lowest priority, 01: the lower priority, 10: the higher priority, and/or 11: the highest priority) for the PUSCH transmission and/or the PUSCH reception. For example, in a case that the UE 102 detects the DCI format for the uplink including the priority indication, the UE 102 may identify the PUSCH transmission and/or the PUSCH reception is prioritized (e.g., the PUSCH transmission and/or the PUSCH reception has the higher priority, the highest priority, the lower priority, and/or the lowest priority).

Additionally or alternatively, a DCI format 0_1 that is used for scheduling of the PUSCH in the cell may be defined as the DCI format for the uplink. Additionally or alternatively, the C-RNTI, the CS-RNTI and/or the first RNTI may be used to transmit the DCI format 0_1. Additionally or alternatively, the DCI format 0_1 may be monitored (e.g., transmitted, mapped) in the CSS and/or the USS.

For example, the DCI included in the DCI format 0_1 may be a BWP indicator (e.g., for the PUSCH). Additionally or alternatively, the DCI included in the DCI format 0_1 may be a frequency domain resource assignment (e.g., for the PUSCH). Additionally or alternatively, the DCI included in the DCI format 0_1 may be a time domain resource assignment (e.g., for the PUSCH). Additionally or alternatively, the DCI included in the DCI format 0_1 may be a modulation and coding scheme (e.g., for the PUSCH). Additionally or alternatively, the DCI included in the DCI format 0_1 may be a new data indicator. Additionally or alternatively, the DCI included in the DCI format 0_1 may be a TPC command for scheduled PUSCH. Additionally or alternatively, the DCI included in the DCI format 0_1 may be a CSI request that is used for requesting the CSI reporting. Additionally or alternatively, as described below, the DCI included in the DCI format 0_1 may be information used for indicating an index of a configuration of a configured grant. Additionally or alternatively, the DCI included in the DCI format 0_0 may be the priority indication (e.g., for the PUSCH transmission and/or for the PUSCH reception).

Additionally or alternatively, a DCI format 0_Y that is used for scheduling of the PUSCH in the cell may be defined as the DCI format for the uplink. Additionally or alternatively, the C-RNTI, the CS-RNTI and/or the first RNTI may be used to transmit the DCI format 0_Y. Additionally or alternatively, the DCI format 0_Y may be monitored (e.g., transmitted, mapped) in the CSS and/or the USS.

For example, the DCI included in the DCI format 0_Y may be a BWP indicator (e.g., for the PUSCH). Additionally or alternatively, the DCI included in the DCI format 0_Y may be a frequency domain resource assignment (e.g., for the PUSCH). Additionally or alternatively, the DCI included in the DCI format 0_Y may be a time domain resource assignment (e.g., for the PUSCH). Additionally or alternatively, the DCI included in the DCI format 0_Y may be a modulation and coding scheme (e.g., for the PUSCH). Additionally or alternatively, the DCI included in the DCI format 0_Y may be a new data indicator. Additionally or alternatively, the DCI included in the DCI format 0_Y may be a TPC command for scheduled PUSCH. Additionally or alternatively, the DCI included in the DCI format 0_Y may be a CSI request that is used for requesting the CSI reporting. Additionally or alternatively, as described below, the DCI included in the DCI format 0_Y may be information used for indicating an index of a configuration of a configured grant. Additionally or alternatively, the DCI included in the DCI format 0_Y may be the priority indication (e.g., for the PUSCH transmission and/or for the PUSCH reception).

Here, the DCI format 0_Y (and/or the DCI format 0_Y including the priority indication, and/or the DCI format 0_Y with the CRC scrambled by the first RNTI, and/or the DCI format 0_Y with the CRC scrambled by the first RNTI including the priority indication) may be used for indicating a priority (e.g., the higher priority, the highest priority, the lower priority, and/or the lowest priority) for the PUSCH transmission and/or the PUSCH reception. For example, in a case that the UE 102 detects the DCI format 0_Y (and/or the DCI format 0_Y including the priority indication, and/or the DCI format 0_Y with the CRC scrambled by the first RNTI, and/or the DCI format 0_Y with the CRC scrambled by the first RNTI including the priority indication), the UE 102 may identify the PUSCH transmission and/or the PUSCH reception is prioritized (e.g., the PUSCH transmission and/or the PUSCH reception has the higher priority, the highest priority, the lower priority, and/or the lowest priority).

Additionally or alternatively, in a case that the DCI format 1_0, the DCI format 1_1 and/or the DCI format 1_X is received (e.g., based on the detection of the DCI format 1_0, the DCI format 1_1, the DCI format 1_X), the UE 102 may perform the PDSCH reception. Additionally or alternatively, in a case that the DCI format 0_0, the DCI format 0_1, and/or the DCI format 0_Y is received (e.g., based on the detection of the DCI format 0_0, the DCI format 0_1, and/or the DCI format 0_Y), the UE 102 may perform the PUSCH transmission.

Here, as described above, a RNTI(s) (e.g., a Radio Network Temporary Identifier(s)) assigned to the UE 102 may be used for transmission of DCI (e.g., the DCI format(s), DL control channel(s) (e.g., the PDCCH(s)). Namely, the gNB 160 may transmit, (e.g., by using the RRC message), information used for configuring (e.g., assigning) the RNTI(s) to the UE 102.

For example, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. For example, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). For example, the UE 102 may detect the DCI format(s) with the RNTI(s).

Here, the RNTI(s) may include the C-RNTI(s) (Cell-RNTI(s)), the CS-RNTI(s) (Configured Scheduling C-RNTI(s)), the SI-RNTI(s) (System Information RNTI(s)), the RA-RNTI(s) (Random Access-RNTI(s)), the Temporary C-RNTI(s), and/or the first RNTI.

For example, the C-RNTI(s) may be a unique identification used for identifying an RRC connection and/or scheduling. Additionally or alternatively, the CS-RNTI(s) may be a unique identification used for scheduling of transmission based on a configured grant. Additionally or alternatively, the SI-RNTI may be used for identifying system information (SI) (e.g., an SI message) mapped on the BCCH and dynamically carried on DL-SCH. Additionally or alternatively, the SI-RNTI may be used for broadcasting of SI. Additionally or alternatively, the RA-RNTI may be an identification used for the random access procedure (e.g., Msg.2 transmission). Additionally or alternatively, the Temporary C-RNTI may be used for the random access procedure (e.g., scheduling of Msg.3 (re)transmission (e.g., Msg.3 PUSCH (re)transmission)).

Here, in the random access procedure (e.g., a contention based random access procedure), the Msg.3 PUSCH transmission (e.g., an initial transmission) may be scheduled by using a random access response grant. For example, in the random access procedure, the random access response grant may be included in the PDSCH (e.g., the Msg.2 transmission). Also, in the random access procedure, the random access response grant may be used for scheduling of the PUSCH for the Msg. 3 transmission. Also, as described above, the PDCCH (i.e., the DCI format 0_0) with the CRC scrambled by the Temporary C-RNTI may be used for scheduling of the PUSCH for the Msg. 3 transmission (e.g., Msg. 3 retransmission).

Additionally or alternatively, the first RNTI may be an identification used for indicating a priority (e.g., the higher priority, the highest priority, the lower priority, and/or the lowest priority) for the PDSCH transmission and/or the PDSCH reception. For example, in a case that the UE 102 detects the PDCCH with the CRC scrambled by the first RNTI, the UE 102 may identify the corresponding PDSCH is prioritized (e.g., the corresponding PDSCH transmission/reception has the higher priority, the highest priority, the lower priority, and/or the lowest priority).

Additionally or alternatively, the first RNTI(s) may be an identification used for indicating a priority (e.g., the higher priority, the highest priority, the lower priority, and/or the lowest priority) for the HARQ-ACK transmission for the PDSCH and/or the HARQ-ACK reception for the PDSCH. For example, in a case that the UE 102 detects the PDCCH with the CRC scrambled by the first RNTI(s), the UE 102 may identify the HARQ-ACK for the corresponding PDSCH is prioritized (e.g., the HARQ-ACK transmission/reception for the corresponding PDSCH has the higher priority, the highest priority, the lower priority, and/or lowest priority).

Additionally or alternatively, the first RNTI(s) may be an identification used for indicating a priority (e.g., the higher priority, the highest priority, the lower priority, and/or the lowest priority) for the PUSCH transmission and/or the PUSCH reception. For example, in a case that the UE 102 detects the PDCCH with the CRC scrambled by the first RNTI, the UE 102 may identify the corresponding PUSCH is prioritized (e.g., the corresponding PUSCH transmission/reception has the higher priority, the highest priority, the lower priority, and/or the lowest priority).

Additionally or alternatively, a physical downlink shared channel (PDSCH) and a physical uplink shared channel (PUSCH) may be defined. For example, in a case that the PDSCH (e.g., the PDSCH resource) is scheduled by using the DCI format(s) for the downlink, the UE 102 may receive the downlink data, on the scheduled PDSCH (e.g., the PDSCH resource). Additionally or alternatively, in a case that the PUSCH (e.g., the PUSCH resource) is scheduled by using the DCI format(s) for the uplink, the UE 102 transmits the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block(s)).

Furthermore, the PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). Here, the RRC message and/or the MAC CE are also referred to as a higher layer signal.

In some approaches, a physical broadcast channel (PBCH) may be defined. For example, the PBCH may be used for broadcasting the MIB (master information block). Here, system information may be divided into the MIB and a number of SIB(s) (system information block(s)). For example, the MIB may be used for carrying include minimum system information. Additionally or alternatively, the SIB(s) may be used for carrying system information messages.

In some approaches, in downlink, a SS (Synchronization Signal) may be defined. The SS may be used for acquiring time and/or frequency synchronization with a cell. Additionally or alternatively, the SS may be used for detecting a physical layer cell ID of the cell.

In the radio communication for uplink, UL RS(s) may be used as uplink physical signal(s). Additionally or alternatively, in the radio communication for downlink, DL RS(s) may be used as downlink physical signal(s). The uplink physical signal(s) and/or the downlink physical signal(s) may not be used to transmit information that is provided from the higher layer, but is used by a physical layer.

Here, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

Also, in a carrier aggregation (CA), the gNB 160 and the UE 102 may communicate with each other using one or more serving cells. Here the one or more serving cells may include one primary cell and one or more secondary cells. For example, the gNB 160 may transmit, by using the RRC message, information used for configuring one or more secondary cells to form together with the primary cell a set of serving cells. Namely, the set of serving cells may include one primary cell and one or more secondary cells. Here, the primary cell may be always activated. Also, the gNB 160 may activate one or more secondary cell within the configured secondary cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 201. As shown in FIG. 2, multiple numerologies 201 (e.g., multiple subcarrier spacing) may be supported. For example, μ (e.g., a subcarrier space configuration) and a cyclic prefix (e.g., the μ and the cyclic prefix for a carrier bandwidth part) may be configured by higher layer parameters (e.g., a RRC message) for the downlink and/or the uplink. Here, 15 kHz may be a reference numerology 201. For example, an RE of the reference numerology 201 may be defined with a subcarrier spacing of 15 kHz in a frequency domain and 2048 Ts+CP length (e.g., 160 Ts or 144 Ts) in a time domain, where Ts denotes a baseband sampling time unit defined as 1/(15000*2048) seconds.

Additionally or alternatively, a number of OFDM symbol(s) 203 per slot ($N_{symb}^{slot}$) may be determined based on the μ (e.g., the subcarrier space configuration). Here, for example, a slot configuration 0 (e.g., the number of OFDM symbols 203 per slot may be 14) and/or a slot configuration (e.g., the number of OFDM symbols 203 per slot may be 7) may be defined.

Figure 3:
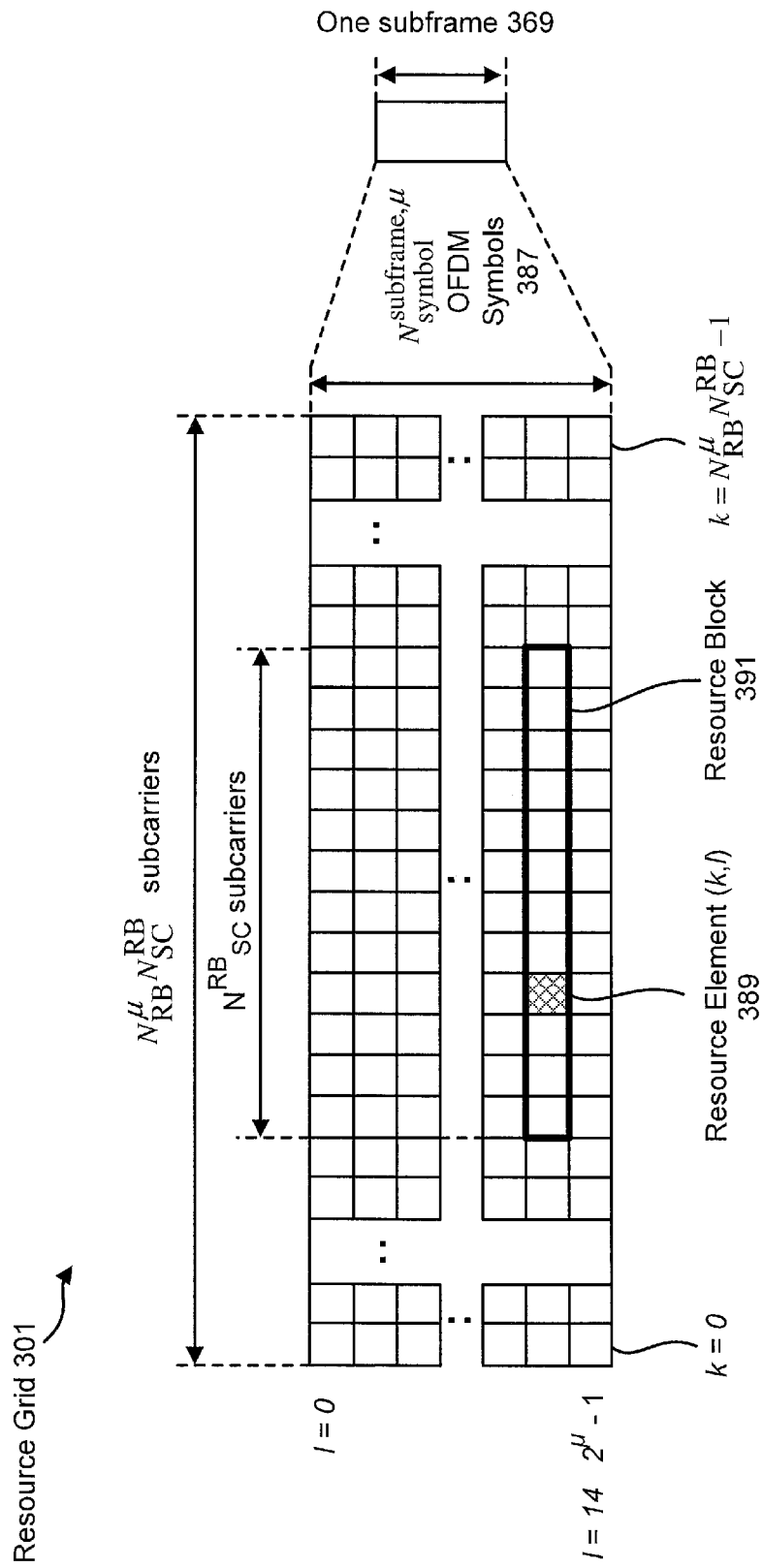
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $N_{symbol}^{subframe,\mu}$ symbols 387. Additionally or alternatively, a resource block 391 may include a number of resource elements (RE) 389. Here, in the downlink, the OFDM access scheme with cyclic prefix (CP) may be employed, which may be also referred to as CP-OFDM. A downlink radio frame may include multiple pairs of downlink resource blocks (RBs) 391 which is also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and l are indices in the frequency and time domains respectively.

Each element in the resource grid 301 (e.g., antenna port p) and the subcarrier configuration μ is called a resource element 389 and is uniquely identified by the index pair (k,l) where k=0, $N_{RB}^{\mu}N_{SC}^{RB}-1$ is the index in the frequency domain and l refers to the symbol position in the time domain. The resource element (k,l) 389 on the antenna port p and the subcarrier spacing configuration p is denoted $(k,l)_{p,\mu}$. The physical resource block 391 is defined as $N_{SC}^{RB}=12$ consecutive subcarriers in the frequency domain. The physical resource blocks 391 are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
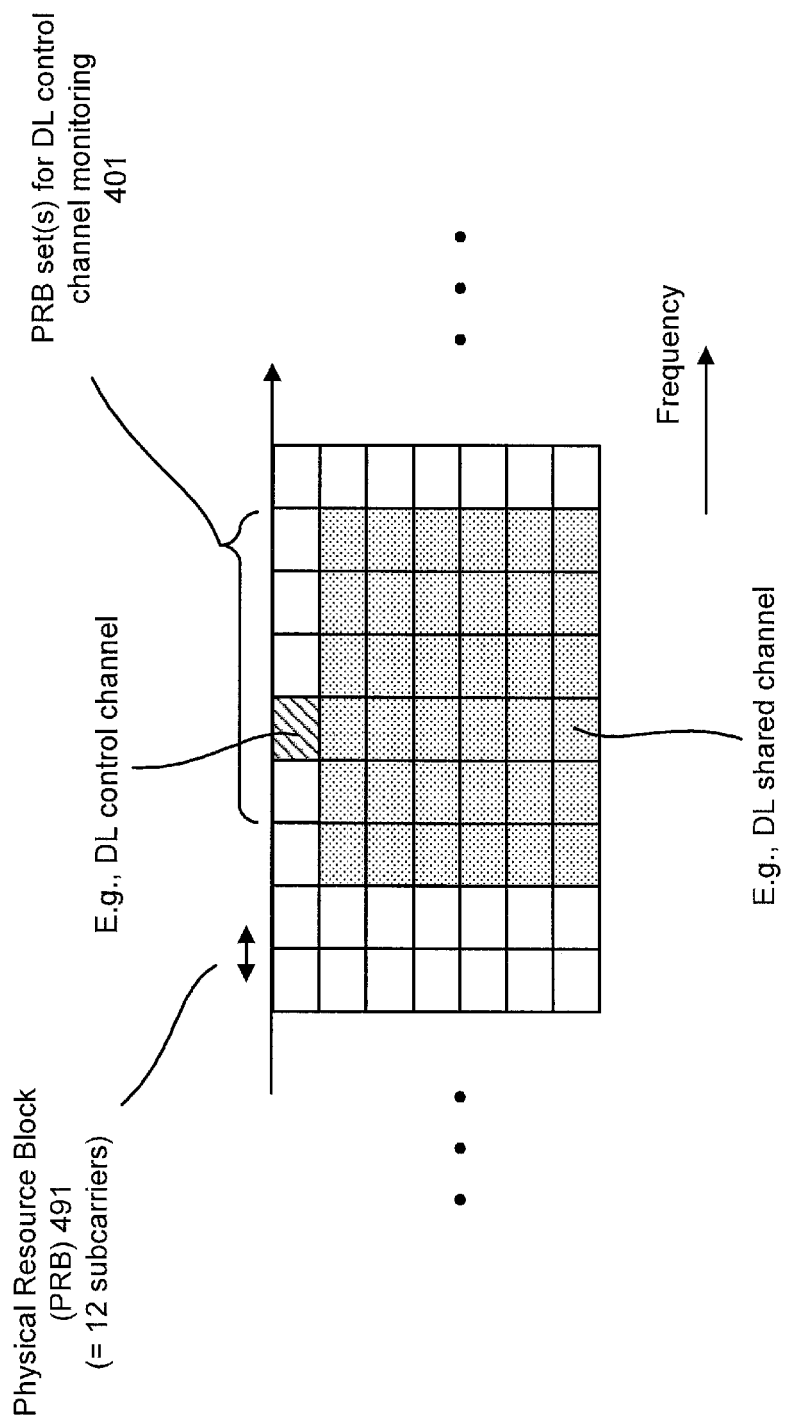
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the CORESET is, in the frequency domain and the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DMRS) for the DL control channel.

The UE 102 may monitor a set of candidates of the PDCCH in one or more control resource sets (e.g., CORESETs) on the active DL bandwidth part (BWP) on each activated serving cell according to corresponding search space sets. Here, the term "monitor" may imply that the UE 102 attempts to decode each PDCCH (e.g., the set of candidates of the PDCCH) according to the monitored DCI format(s). Also, the candidates of the PDCCH may be candidates for which the DL control channel(s) may possibly be mapped, assigned, and/or transmitted.

The set of candidates of the PDCCH for the UE 102 to monitor may be defined in terms of a search space set(s) (e.g., also referred to simply as a search space(s)). The UE 102 may monitor the set of candidates of the PDCCH in the search space(s). The search space set(s) may comprise a common search space(s) (CSS(s), UE-common search space(s)) and/or a user equipment-specific search space(s) (USS, UE-specific search space(s)).

Namely, the CSS and/or the USS may be defined (e.g., configured) in a region(s) of DL control channel(s). For example, the CSS may be used for transmission of DCI to a plurality of the UEs 102. For example, a Type0-PDCCH common search space may be defined for the DCI format(s) with CRC scrambled by the SI-RNTI. Additionally or alternatively, a Type1-PDCCH common search space may be defined for the DCI format(s) with CRC scrambled by the RA-RNTI, the Temporary C-RNTI, and/or the C-RNTI. Additionally or alternatively, a Type3-PDCCH common search space may be defined for the DCI format(s) with CRC scrambled by the C-RNTI, and/or the CS-RNTI.

The USS may be used for transmission of DCI to a specific UE 102. For example, the USS may be determined based on a Radio Network Temporary Identifier (RNTI) (e.g., the C-RNTI). For instance, the USS may be defined for the DCI format(s) with CRC scrambled by the C-RNTI, and/or the CS-RNTI.

Here, the gNB 160 may transmit, by using the RRC message, first information used for configuring (e.g., determining) one or more CORESETs. For example, for each of DL BWPs (e.g., each of DL BWPs in the serving cell), the gNB 106 may transmit, by using the RRC message, the first information used for configuring the one or more CORESET. For example, the first information may include information used for configuring an index of the CORESET. Also, the first information may include information used for configuring a number of consecutive symbols for the CORESET. Also, the first information may include information used for configuring a set of resource blocks for the CORESET.

Here, the index "0" of the CORESET (i.e., a value "0" of the CORESET) may be configured by using the MIB and/or the SIB(s). For example, the index "0" of the CORESET may be used for identifying a common CORESET configured in the MIB and/or the SIB(s). Namely, the index of the CORESET except for the value "0" may be configured as the index of the CORESET. Also, the index of the CORESET with the value "0" may be configured by using information of a CORESET-zero. Also, the index "0" of the CORESET may be configured by using a dedicated RRC message (i.e., a UE-specific RRC message, and/or a serving cell-specific RRC message). Namely, the gNB 160 may transmit, by using the MIB, information used for configuring the CORE- SET with the index "0" (i.e., a CORESET #0). Additionally or alternatively, the gNB 160 may transmit, by using the SIB(s), the information used for configuring the CORESET #0. Additionally or alternatively, the gNB 160 may transmit, by using the dedicated RRC message, the information used for configuring the CORESET #0.

Here, the CORESET #0 may be configured for an initial BWP(s) (e.g., the initial DL BWP(s)). Here, the gNB 160 may transmit, by using the RRC message (e.g., the MIB, the SIB(s), and/or the dedicated RRC message), information used for the initial BWP(s) (e.g., the initial BWP(s)). Also, an index of the initial BWP(s) (e.g., the initial DL BWP(s)) may be "0". Namely, the index "0" (e.g., the value "0") may be applied (e.g., defined) for the initial BWP(s) (e.g., the initial DL BWP(s)). For example, (e.g., for the primary cell), the initial BWP(s) (i.e., the BWP with the index "0") may be the BWP(s) used for an initial access. Additionally or alternately, (e.g., for the secondary cell(s)), the initial BWP(s) (i.e., the BWP(s) with the index "0") may be the BWP(s) configured for the UE to first operate at the secondary cell(s) activation.

Here, the gNB 106 may transmit, by using the RRC message (e.g., the MIB, the SIB(s), and/or the dedicated RRC message), information used for configuring an index of the DL BWP(s) (e.g., the index other than the index "0"). Also, the gNB 106 may transmit, by using the RRC message (e.g., the MIB, the SIB(s), and/or the dedicated RRC message), information used for configuring an index of the UL BWP(s) (e.g., the index other than the index "0").

As described above, the CORESET #0 may be referred to as the common CORESET. Also, the CORESET other than the CORESET #0 may be referred to as a UE-specific CORESET. Namely, the CORESET with the index "X (e.g., X=1, 2, 3, . . . )" other than the index "0" may be referred to as the UE-specific CORESET. For example, the gNB 160 may transmit, by using the dedicated RRC message, information used for configuring the UE-specific CORESET (e.g., the index of the UE-specific CORESET).

Additionally or alternatively, for each of the one or more CORESETs, the search space set(s) (e.g., the set(s) of the CSS(s) and/or the USS(s)) may be configured. For example, the first information may be configured per DL BWP. Namely, the first information may be configured for each of the DL BWPs in the serving cell.

Additionally or alternatively, the gNB 160 may transmit, by using the RRC message, second information used for configuring the search space set(s). For example, the second information may be configured for each search space set. For example, the second information may include information used for configuring an index of the search space set(s). Additionally or alternatively, the second information may include information used for configuring the index of the CORESET(s) associated with the search space set(s). Additionally or alternatively, the second information may include information used for indicating a PDCCH monitoring periodicity and/or a PDCCH monitoring offset where the UE 102 monitors the PDCCH(s) in the search space set(s). Additionally or alternatively, the second information may include information used for indicating a PDCCH monitoring pattern within a slot. For example, the information used for indicating the PDCCH monitoring pattern may be used for indicating first symbol(s) within a slot for the PDCCH monitoring. For instance, the UE 102 may determine a PDCCH monitoring occasion(s) based on the PDCCH monitoring periodicity, the PDCCH monitoring offset, and/or the PDCCH monitoring pattern within a slot.

Additionally or alternatively, the second information may include information used for indicating a type of the search space set (e.g., information used for indicating that the search space set is either the CSS or the USS). Additionally or alternatively, the second information may include information used for indicating one or more DCI formats which accordingly the UE 102 monitors the PDCCH in the search space set(s). For example, if the search space set is the CSS (e.g., if the search space set is configured as the CSS), the DCI format 0_0 and/or the DCI format 1_0 may be configured to monitor the PDCCH (e.g., the candidate(s) of the PDCCH(s)). Here, the DCI format(s) for monitoring the PDCCH in the CSS may be scrambled by the C-RNTI, the CS-RNTI, the RA-RNTI, the Temporary C-RNTI, the SI-RNTI, and/or the first RNTI.

Additionally or alternatively, if the search space set is the USS (e.g., if the search space set is configured as the USS), the DCI format 0_0, the DCI format 1_0, the DCI format 0_Y, and/or the DCI format 1_X may be configured to monitor the PDCCH (e.g., the candidate(s) of the PDCCH(s)). Additionally or alternatively, if the search space set is the USS, the DCI format 0_1, the DCI format 1_1, the DCI format 0_Y, and/or the DCI format 1_X may be configured to monitor the PDCCH (e.g., the candidate(s) of the PDCCH(s)). For example, if the search space set is the USS, either of a first set of DCI formats (e.g., the DCI format 0_0, the DCI format 1_0, and/or the DCI format 0_Y, and/or the DCI format 1_X) or a second set of DCI formats (e.g., the DCI format 0_1, the DCI format 1_1, the DCI format 0_Y, and/or the DCI format 1_X) may be configured to monitor the PDCCH (e.g., the candidate(s) of the PDCCH(s)). Here, the DCI format(s) for monitoring the PDCCH in the USS may be scrambled by the C-RNTI, the CS-RNTI, and/or the first RNTI. For example, the second information may be configured per search space set. Namely, the second information may be configured for each of search space sets.

Here, the index "0" of the search space set (i.e., a value "0" of the search space set) may be configured by using the MIB and/or the SIB(s). For example, the index "0" of the search space set may be used for identifying a common search space set configured in the MIB and/or the SIB(s). Namely, the index of the search space set except for the value "0" may be configured as the index of the search space. Also, the index of the search space set with the value "0" may be configured by using information of search space-zero. Also, the index "0" of the search space set may be configured by using a dedicated RRC message (i.e., a UE-specific RRC message, and/or a serving cell-specific RRC message). Namely, the gNB 160 may transmit, by using the MIB, information used for configuring the search space set with the index "0" (i.e., the search space set #0). Additionally or alternatively, the gNB 160 may transmit, by using the SIB(s), the information used for configuring the search space set #0. Additionally or alternatively, the gNB 160 may transmit, by using the dedicated RRC message, the information used for configuring the search space set #0. Here, the search space set #0 may be configured for the initial BWP(s) (e.g., the initial DL BWP(s)).

As described above, the search space set #0 may be referred to as the common search space set. Also, the search space set other than the search space set #0 may be referred to as a UE-specific search space set. Namely, the search space set with the index "X (e.g., X=1, 2, 3, . . . )" other than the index "0" may be referred to as the UE-specific search space set. For example, the gNB 160 may transmit, by using the dedicated RRC message, information used for configuring the UE-specific search space set (e.g., the index of the UE-specific search space set).

Here, for example, for the serving cell(s), the gNB 160 may configure, by using the RRC message, a set of four DL BWPs (e.g., at most four DL BWPs, a DL BWP set) (e.g., for receptions by the UE 102). Additionally or alternatively, the gNB 160 may indicate, by using the DCI format(s) for the downlink, an active DL BWP(s). For example, for each DL BWP in the set of DL BWPs, the gNB 160 may configure, by using the RRC message, the subcarrier spacing, the cyclic prefix, a number of contiguous PRBs 491 (e.g., a bandwidth of PRBs), and/or an index (e.g., the index of the DL BWP(s)) in the set of DL BWPs.

Additionally or alternatively, for the serving cell(s), the gNB 160 may configure, by using the RRC message, a set of four UL BWP(s) (e.g., at most four UL BWPs, a UL BWP set) (e.g., for transmissions by the UE 102). Additionally or alternatively, the gNB 160 may indicate, by using the DCI format(s) for the uplink, an active UL BWP(s). Additionally or alternatively, for each UL BWP in the set of UL BWPs, the gNB 160 may configure, by using the RRC message, the subcarrier spacing, the cyclic prefix, a number of contiguous PRBs 491 (e.g., a bandwidth of PRBs), an index (e.g., the index of the UL BWP(s)) in the set of UL BWPs.

Additionally or alternatively, the UE 102 may perform, based on the configuration(s) for the DL BWP(s), reception(s) on the PDCCH in the DL BWP(s) and/or reception(s) on the PDSCH in the DL BWP(s). Additionally or alternatively, the UE 102 may perform, based on the configuration(s) for the UL BWP(s).

Figure 5:
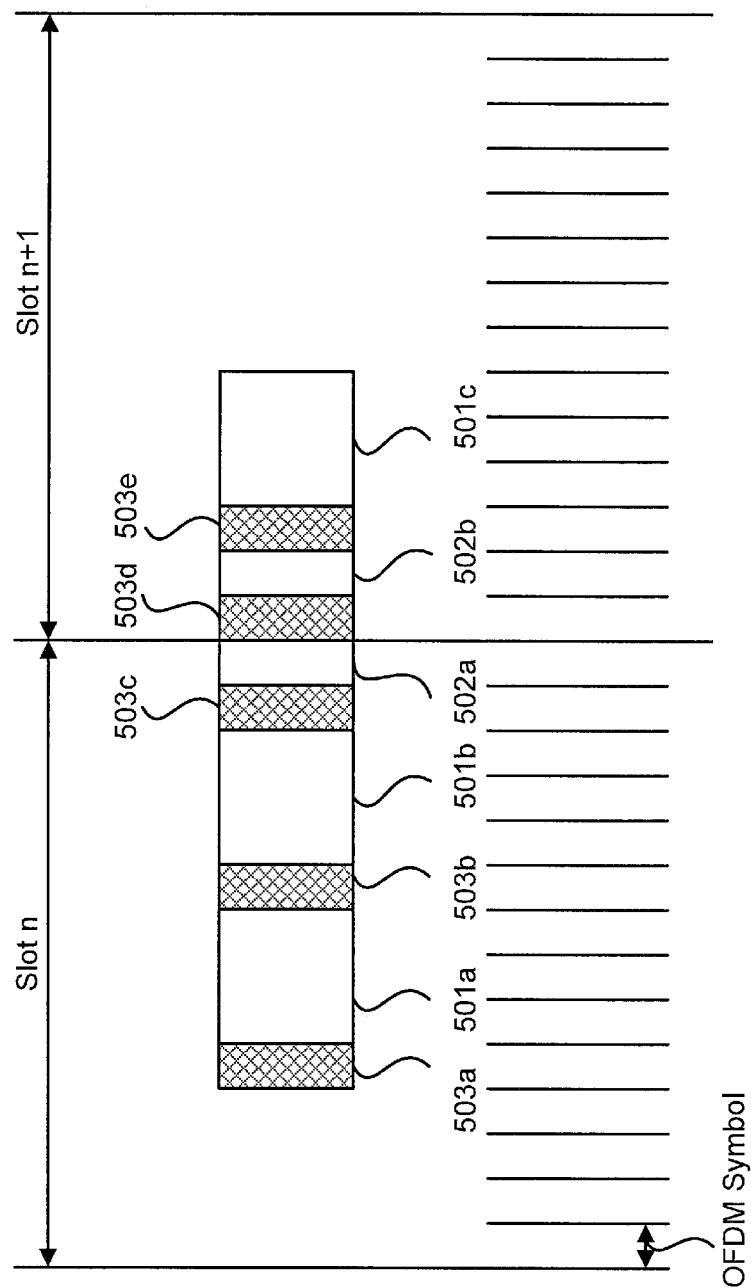
FIG. 5 shows an example of the mini-slot repetition and multi-segment transmissions.

FIG. 5 shows an example of the mini-slot repetition and multi-segment transmissions. This figure illustrates one or more actual PUSCH repetitions (501*a*, 501*b*, and 501*c*) in one slot (this may be referred to as "mini-slot repetition") and/or two or more actual PUSCH repetitions (502*a* and 502*b*) across slot boundary in consecutive available slots (this may be referred to as "multi-segment transmission") that are supported using one UL grant for dynamic PUSCH scheduled by DCI, and one configured grant configuration for configured grant PUSCH. Here, dynamic PUSCH may be a PUSCH scheduled by DCI on a PDCCH and a configured grant PUSCH may be referred to as type 1 or type 2 configured grant scheduling. A configured grant configuration may be a PUSCH transmission resource (e.g., periodicity, the number of repetitions, etc.) configured by RRC. For type 1 configured grant, a UE 102 may transmit a PUSCH according to RRC configuration. For type 2 configured grant, a UE 102 may transmit a PUSCH according to RRC after DCI activates the transmission of a PUSCH and until DCI deactivates the transmission of a PUSCH. Mini-slot may be referred to as "PUSCH mapping type B." 503*a*, 503*b*, 503*c*, 503*d*, and 503*e* are DMRS symbols and each of the DMRS symbols may be mapped to the first OFDM symbol within a mini-slot and/or a segment.

In this example depicted in FIG. 5, the number of repetitions (represented by K in this disclosure) is 4 and the number of OFDM symbols scheduled for a PUSCH (represented by L in this disclosure) is 4. In this case, the total number of OFDM symbols including repetitions are K*L=16. The first repetition is 501*a*, the second repetition is 501*b*, the third repetition is 502*a* and 502*b*, and the fourth repetition is 501*c*. In addition, in this example, the start OFDM symbol index (represented by S in this disclosure) is S=3, where OFDM symbols are indexed 0, 1, . . . , 13 within a slot. As show in this figure, the 3rd repetition is mapped across slot boundary, and this repetition is split into two segments 502*a* and 502*b*.

Figure 6:
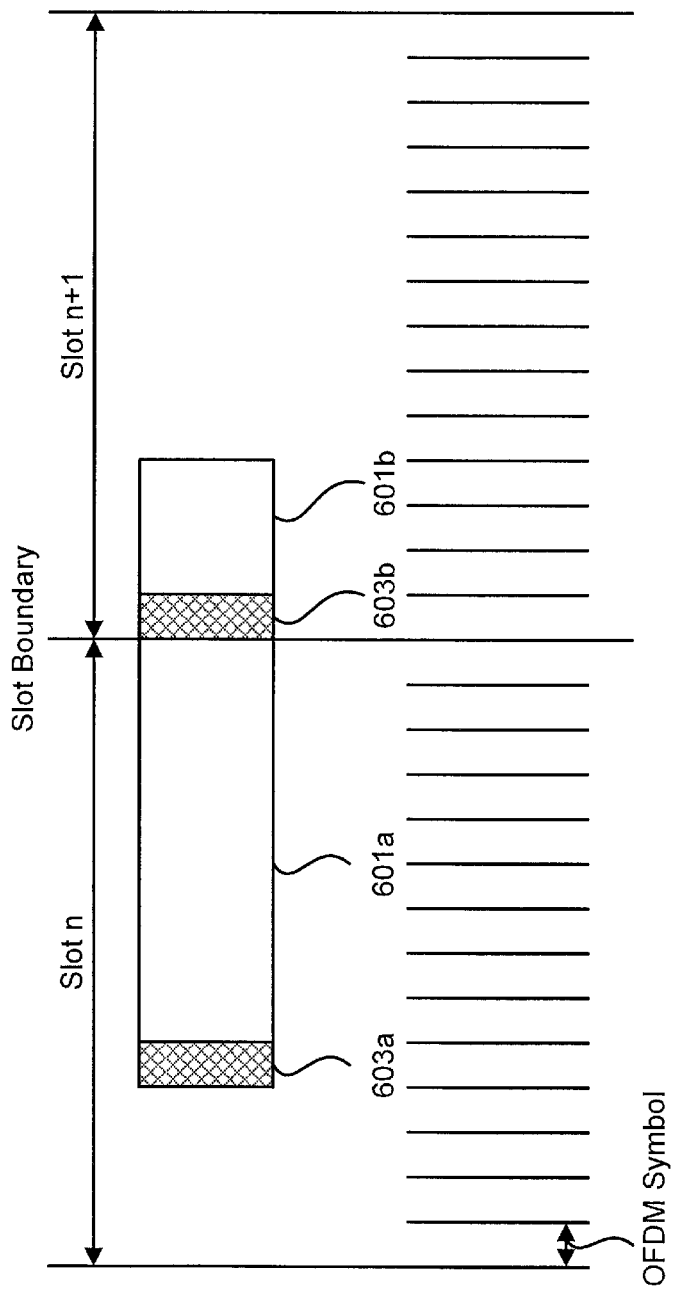
FIG. 6 illustrates an example of multi-segment transmission.

As another example, FIG. 6 illustrates an example of multi-segment transmission. In this case, the number of repetition K is 1 but the number of scheduled OFDM symbols (L) is 14 and start OFDM symbol index (S) of the scheduled PUSCH is 3. And a PUSCH is split into two segments 601*a* and 601*b*. Even in case of K=1, if S+L>14, a UE 102 may transmit a PUSCH with multi-segment transmission as shown in FIG. 6. 603*a* and 603*b* are DMRS symbols and each of the DMRS symbols may be mapped to the first OFDM symbol within a segment.

When DCI scheduled a PUSCH, the DCI may include the number of scheduled OFDM symbols (L) of the first repetition (501*a* in FIG. 5 and the sum of OFDM symbols of 601*a* and 602*b*). The DCI may include the number of repetitions (K). The DCI may include the combination of the start OFDM symbol index and the number of scheduled OFDM symbols (this is referred to as SLIV (Start and Length Indicator Value)).

How to determine a transport block size (TBS) is also described herein. The TBS may be the size of the data bits (UL-SCH bits) transferred from the MAC layer. The TBS may be determined by the number of resource elements (REs) for DMRS symbols, the number of REs as overhead configured by RRC, the number of scheduled OFDM symbols, and/or the number of scheduled physical resource blocks (PRBs).

The TBS may be determined by the number of OFDM symbols indicated by an SLIV field in DCI. Alternately, the TBS may be determined by the minimum number of OFDM symbols of mini-slots and/or segments scheduled in the time domain. For example, in FIG. 5, the numbers of OFDM symbols for each mini-slot or each segment are 4 for a mini-slot 501*a*, 4 for a mini-slot 501*b*, 2 for a segment 502*a*, 2 for a segment 502*b*, and 4 for a mini-slot 501*b* symbols. In this case, the number of OFDM symbols to determine the TBS is 4. Alternately, in FIG. 5, the number of OFDM symbols to determine the TBS of the 3rd repetition may be 4.

Alternately or additionally, for the multi-segment transmission across slot boundary, when a UE 102 determines the TBS for the 3rd repetition (for segments 502*a* and 502*b*), the UE 102 may use both the number of DMRS symbols of the 1st segment (502*a*) and the number of DMRS symbols of the 2nd segment (502*b*). For example, in the FIG. 5 case, a UE 102 is configured with one OFDM symbol for DMRS and additional DMRS are not configured. In this case, for the TBS calculation for the 1st, 2nd, and 4th repetition, the number OFDM symbols of the DMRS that the UE 102 may use is one. However, for the TBS calculation for multi-segment transmission, the DMRS symbols are mapped on two time resources across the slot boundary. Therefore, the TBS may be calculated by using 2 OFDM symbols for the DMRS symbol(s) for each segment. Furthermore, when the number of REs of DMRS symbols configured and/or indicated for a PUSCH transmission is $N_{DMRS\_RE}$ and the number of slots for a multi-segment transmission is $N_{slot\_seg}$, the number of OFDM symbols to calculate the TBS may be $N_{DMRS\_RE} * N_{slot\_seg}$. When a UE 102 calculates the TBS, the DMRS symbols added by the multi-segment transmission (one repetition across slot boundary) may be used in addition to the DMRS configuration (type 1 or type 2) and additional DMRS. As another word, the number of REs of DMRS may be defined as the number of REs for DMRS per PRB in the scheduled duration including the overhead of the DMRS CDM (code division multiplexing) groups without data, as indicated by DCI format 1_1 or as described for format 1_0. The CDM group may be defined the DMRS RE group whose REs are not used to map the UL-SCH data.

Alternately or additionally, the maximum number of DMRS REs of all the repetitions may be used to calculate TBS.

In the above examples, this disclosure discloses that the number of repetitions and SLIV are indicated by the DCI. Alternately, the combination of the number of repetitions and the time domain resource allocation for each value of SLIV field may be configured by RRC.

How to determine the redundancy version (RV) of each repetition is also described herein. For slot-based repetitions, RVs for repetitions may be determined by an RV indicated by the DCI scheduling the PUSCH and a predefined RV sequence and/or pattern (for grant-based transmission), or by a RV sequence and/or pattern configured by RRC (for configured grant). For example, when transmitting PUSCH scheduled by PDCCH with CRC scrambled with C-RNTI, MCS-C-RNTI (or CS-RNTI with NDI=1), if the UE 102 is configured with a high layer parameter indicating the number of repetitions (e.g., pusch-AggregationFactor), the same symbol allocation is applied across the pusch-AggregationFactor consecutive slots and the PUSCH is limited to a single transmission layer. The UE 102 may repeat the TB across the pusch-AggregationFactor consecutive slots applying the same symbol allocation in each slot. The redundancy version to be applied on the nth transmission occasion of the TB may be determined according to Table 1. If the UE procedure for determining slot configuration, determines symbols of a slot allocated for PUSCH as downlink symbols, the transmission on that slot may be omitted for multi-slot PUSCH transmission. Table 1 provides the redundancy version when pusch-AggregationFactor is present.

TABLE 1

| RV indicated by the DCI scheduling the PUSCH | RV to be applied to nth transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In yet another example, for configured grant, the higher layer configured parameters repetition number (e.g., repK) and RV sequence (e.g., repK-RV) define the K repetitions to be applied to the transmitted transport block, and the redundancy version pattern to be applied to the repetitions. If the parameter repK is not provided by RRC configuration (e.g., in the configuredGrantConfig), the redundancy version for uplink transmissions with a configured grant may be set to 0. Otherwise, for the nth transmission occasion among K repetitions, n=1, 2, ..., K, it is associated with (mod(n−1, 4)+1)th value in the configured RV sequence.

The initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, or any of the transmission occasions of the K repetitions if the configured RV sequence is {0,0,0,0}, except the last transmission occasion when K=8.

For any RV sequence, the repetitions may be terminated after transmitting K repetitions, or at the last transmission occasion among the K repetitions within the period P, or from the starting symbol of the repetition that overlaps with a PUSCH with the same HARQ process scheduled by DCI format 0_0 or 0_1, whichever is reached first. The UE 102 is not expected to be configured with the time duration for the transmission of K repetitions larger than the time duration derived by the periodicity P. For both Type 1 and Type 2 PUSCH transmissions with a configured grant, when the UE 102 is configured with repK>1, the UE 102 may repeat the TB across the repK consecutive slots applying the same symbol allocation in each slot. If the UE procedure for determining slot configuration, determines symbols of a slot allocated for PUSCH as downlink symbols, the transmission on that slot is omitted for multi-slot PUSCH transmission.

For mini-slot repetitions and multi-segment transmissions, similar rules as slot-based repetitions above or different rules may be applied to determine the RV for each repetition. There may be different options to apply mini-slot repetitions and multi-segment transmissions. For each option, the design for RV determination may be different.

For example, one or more actual PUSCH repetitions in one slot, or two or more actual PUSCH repetitions across slot boundary in consecutive available slots, are supported using one UL grant for dynamic PUSCH, and one configured grant configuration for configured grant PUSCH by an Option-A. The number of the repetitions signaled (dynamically signaled, e.g., DCI indicated, or semi-statically signaled, e.g., RRC configured, or combination of them) by the gNB 160 represents the "nominal" number of repetitions. The actual number of repetitions can be larger than the nominal number. The time domain resource assignment (TDRA) field in the DCI or the TDRA parameter in the type 1 configured grant indicates the resource for the first "nominal" repetition. The time domain resources for the remaining repetitions are derived based at least on the resources for the first repetition and the UL/DL direction of the symbols. If a "nominal" repetition (transmission occasion) goes across the slot boundary or DL/UL switching point, this "nominal" repetition (transmission occasion) is split into multiple PUSCH repetitions (transmission occasions), with one PUSCH repetition (transmission occasion) in each UL period in a slot. How to handle the split PUSCH repetitions may result in different approaches for RV determinations.

In a design, the RV for each transmission occasion including split transmission occasions may be determined by the RV indicated by the DCI scheduling the PUSCH and/or a predefined or RRC configured RV sequence and/or pattern (for grant-based transmission), or by an RV sequence and/or pattern configured by RRC or indicated by L1 signaling (for configured grant). When transmitting PUSCH scheduled by PDCCH with CRC scrambled with C-RNTI, MCS-C-RNTI (or CS-RNTI with NDI=1), the redundancy version to be applied on the nth transmission occasion (including the split transmission occasions) of the TB may be determined according to the Table 1.

Figure 7A:
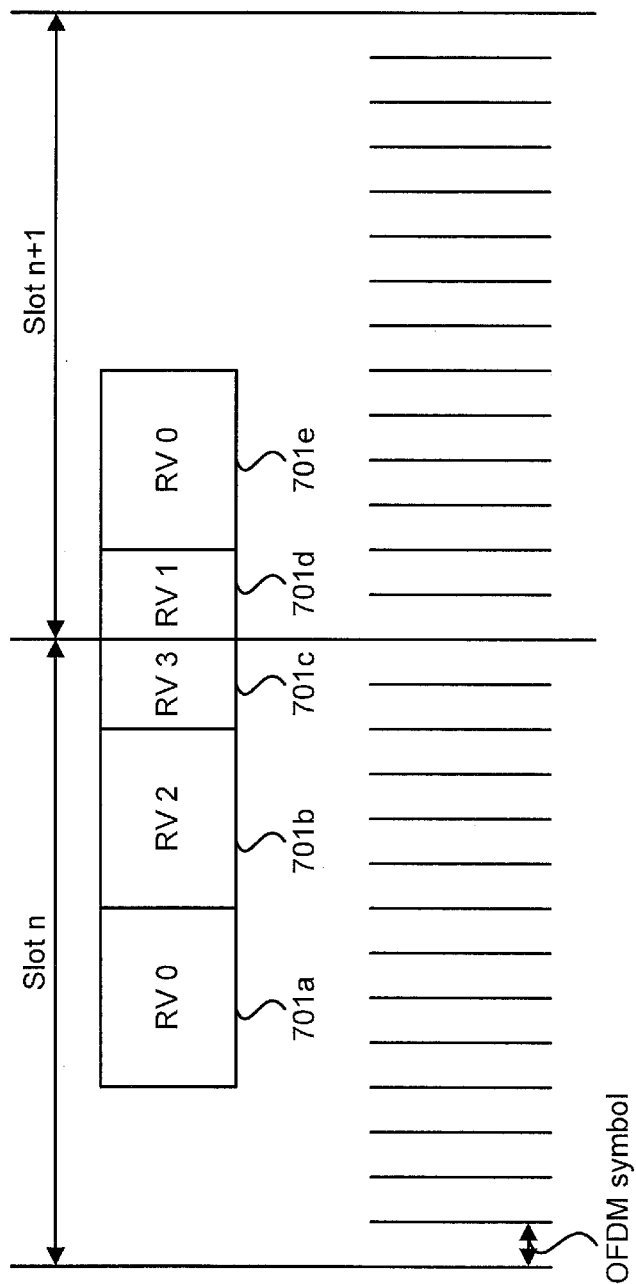
FIG. 7A illustrates an example of redundancy version (RV) determination for split transmission occasions.

FIG. 7A illustrates an example of redundancy version (RV) determination for split transmission occasions. In this example, the number of repetitions is 4. The nominal length of repetition (L) is 4 symbols. The actual number of repetitions is 5. The 3rd nominal repetition is split into two repetitions due to the slot boundary. The predetermined RV sequence is {0, 2, 3, 1} and the RV for the first transmission occasion 701a is indicated by 0. Since the RV sequence is applied to all the transmission occasions 701a-e including split transmission occasions, the RV of the third transmission occasion 701c is 3 and the RV of the fourth transmission occasion 701d is 1. The RV sequence may be fixed by specification, indicated by L1 signaling, or configured by RRC. The RV for the first transmission occasion 701a may be fixed by specification, indicated by L1 signaling, or configured by RRC. For configured grant, for the nth transmission occasion including split transmission occasions among K_act repetitions, n=1, 2, ..., K_act, it is associated with the (mod(n−1,4)+1)th value in the configured RV sequence.

In yet another design, the RV for each nominal transmission occasion may be determined by the RV indicated by the DCI scheduling the PUSCH and/or a predefined or RRC configured RV sequence and/or pattern (for grant-based transmission), or by a RV sequence and/or pattern configured by RRC or indicated by L1 signaling (for configured grant). In this design, the RV for each split transmission occasion may use a different pattern, which may be fixed by specification, indicated by L1 signaling, or configured by RRC. For the split repetitions from a nominal repetition, coded bits are mapped to the overall resource of the split repetitions contiguously and the RV for the overall resource is same as the one determined for the nominal repetition.

Figure 7B:
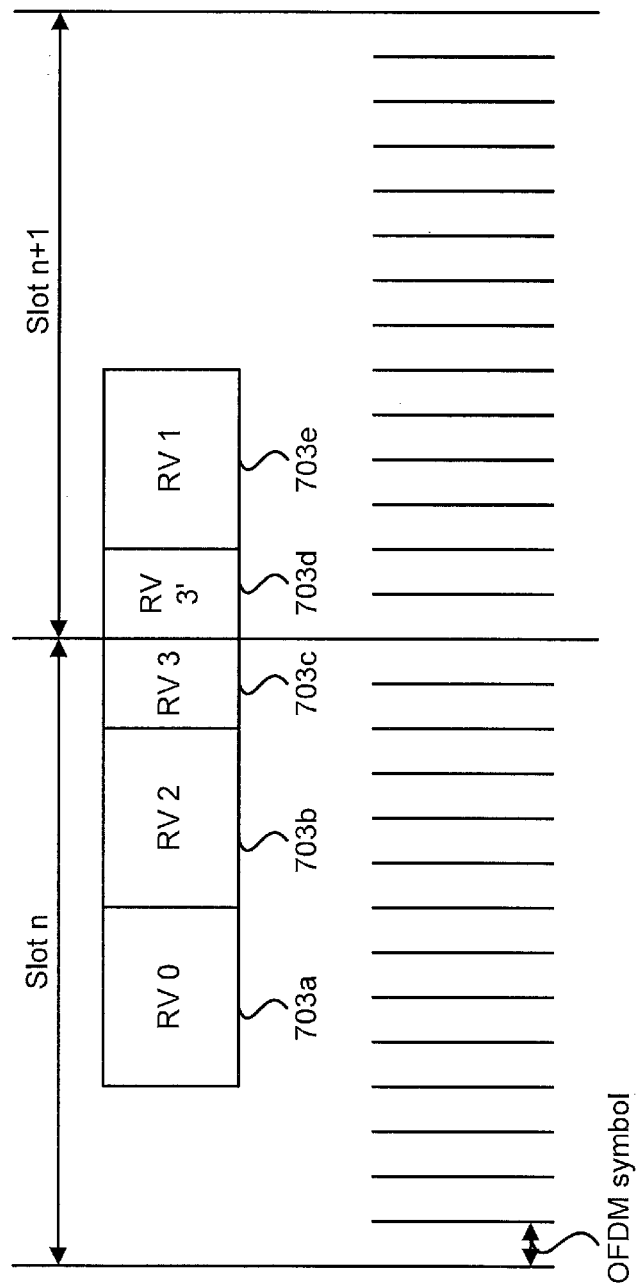
FIG. 7B illustrates another example of RV determination for split transmission occasions.

FIG. 7B illustrates another example of RV determination for split transmission occasions. In this example, the number of repetitions is 4. The nominal length of repetition (L) is 4 symbols. The actual number of repetitions is 5. The predetermined RV sequence is {0, 2, 3, 1} and the RV for the first transmission occasion 703a is indicated by 0 and the RV for the second transmission occasion 703b is indicated by 2. In this example, the fourth actual repetition (the fourth transmission occasion 703d) uses coded bits contiguously following the third actual repetition (the third transmission occasion 703c). The coded bits of the fourth transmission occasion 703d are represented as 3'. The RV for the fifth transmission occasion 703e is indicated by 1.

FIG. 7C illustrates yet another example of RV determination for split transmission occasions. In this example, the number of repetitions is 4. The nominal length of repetition (L) is 4 symbols. The actual number of repetitions is 5. In this example, the RV sequence {0, 3}, which may be fixed by specification, indicated by L1 signaling, or configured by RRC, is applied to the split repetitions. In this example, the split repetitions are the third actual repetition (the third transmission occasion 705c) and the fourth repetition (the fourth transmission occasion 705d). The RV for the first transmission occasion 705a is indicated by 0, the RV for the second transmission occasion 705b is indicated by 2, and the RV for the fifth transmission occasion 705e is indicated by 1.

The RV for an actual repetition (transmission occasion) may be determined by the length (e.g., number of symbols) for this repetition. For example, if the length is less (or greater) than a predefined value (which may be fixed by specification, indicated by L1 signaling, or configured by RRC) or length of another repetition, a predefined RV (which may be fixed by specification, indicated by L1 signaling, or configured by RRC) may be applied to the repetition. Any RV sequence or any RV value may be applied to the split repetitions (transmission occasions).

In yet another example, one or more PUSCH repetitions in one slot, or two or more PUSCH repetitions across a slot boundary in consecutive available slots, are supported using one UL grant for dynamic PUSCH, and one configured grant configuration for configured grant PUSCH by an Option-B. The time domain resource assignment (TDRA) field in the DCI or the TDRA parameter in the type 1 configured grant indicates an entry in the higher layer configured table. The number of repetitions, starting symbols of each repetition, length of each repetition, and mapping of the repetitions to slots can be obtained from each entry in the table. More than one repetition can be mapped to one slot. The resource assignment for each repetition is contained within one slot. Each transmitted repetition is contained within one UL period in a slot. Since the resource for each repetition (transmission occasion) is explicitly indicated and/or configured, any rule, sequence and/or pattern for RV determination mentioned above may be applied. The RV for each indicated and/or configured repetition (transmission occasion) may be determined by the RV indicated by the DCI scheduling the PUSCH and/or a predefined or RRC configured RV sequence and/or pattern (for grant-based transmission), or by a RV sequence and/or pattern configured by RRC or indicated by L1 signaling (for configured grant). The RV for an indicated and/or configured repetition (transmission occasion) may be determined by the length (number of symbols) for this repetition. For example, if the length is less (or greater) than a predefined value (which may be fixed by specification, indicated by L1 signaling, or configured by RRC) or the length of another repetition, a predefined RV (which may be fixed by specification, indicated by L1 signaling, or configured by RRC) may be applied to the repetition.

How to select the rules for the RV determination described above may be fixed by specification, indicated by L1 signaling, or configured by RRC. The rule, sequence and/or pattern for RV determination for each PUSCH configuration (if multiple PUSCH configurations are supported, enabled and/or configured) and/or for each configured grants (if multiple configured grant configurations are supported, enabled and/or configured) may be indicated and/or configured commonly or separately.

Figure 8:
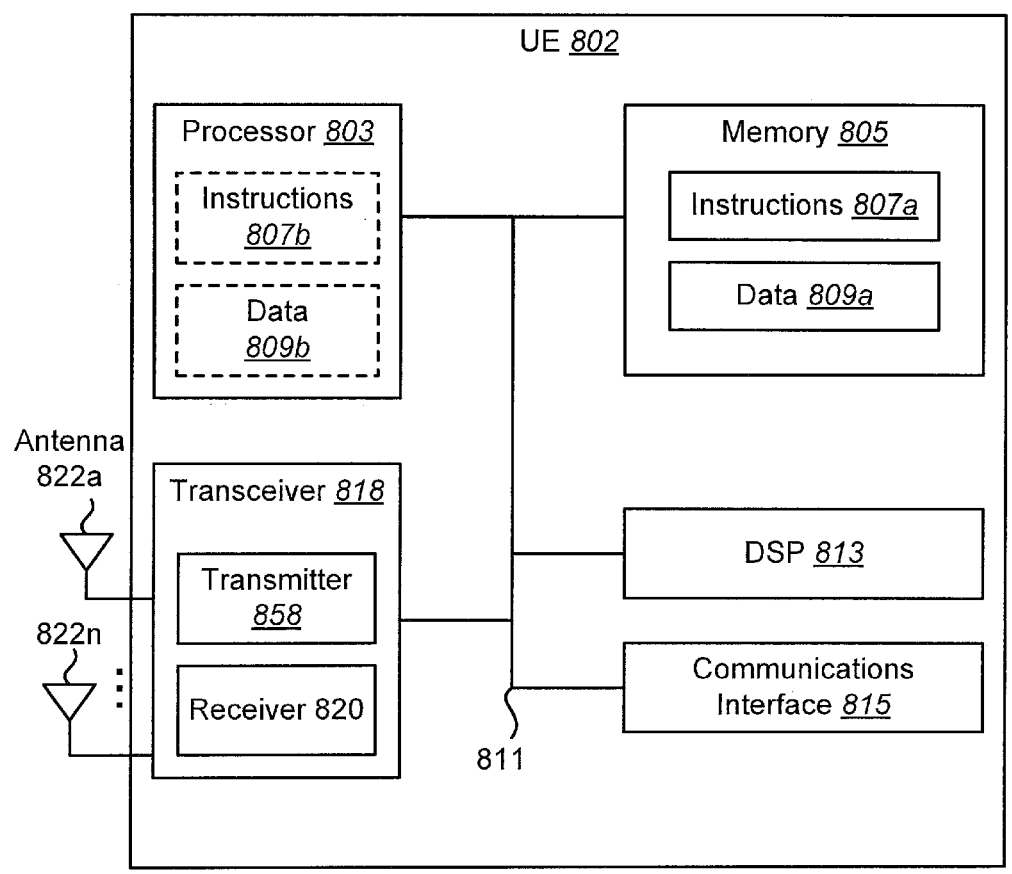
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 803 that controls operation of the UE 802. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described herein.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 811, which may include a power bus, a control signal bus and a status signal bus, in addition to a data bus. However, for the sake of clarity, the various buses are illustrated in FIG. 8 as the bus system 811. The UE 802 may also include a digital signal processor (DSP) 813 for use in processing signals. The UE 802 may also include a communications interface 815 that provides user access to the functions of the UE 802. The UE 802 illustrated in FIG. 8 is a functional block diagram rather than a listing of specific components.

Figure 9:
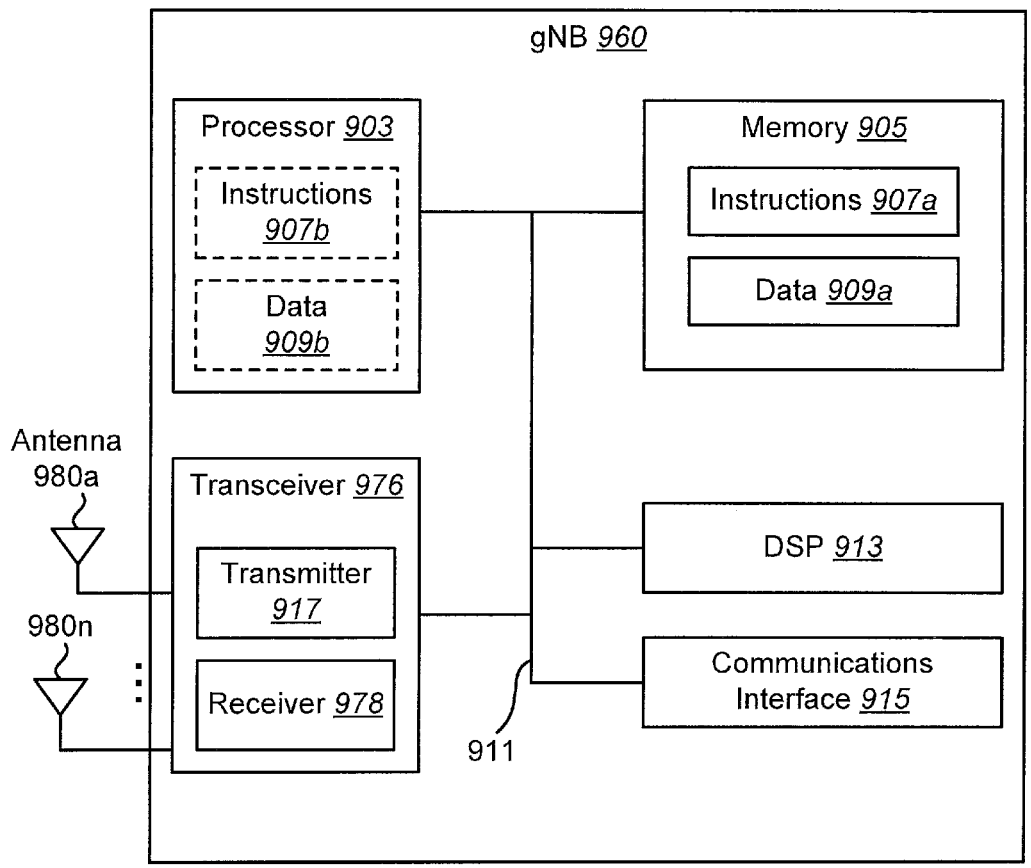
FIG. 9 illustrates various components that may be utilized in a gNB.

FIG. 9 illustrates various components that may be utilized in a gNB 960. The gNB 960 described in connection with FIG. 9 may be implemented in accordance with the gNB 160 described in connection with FIG. 1. The gNB 960 includes a processor 903 that controls operation of the gNB 960. The processor 903 may also be referred to as a central processing unit (CPU). Memory 905, which may include read-only memory (ROM), random access memory (RAM), a combination of the two or any type of device that may store information, provides instructions 907a and data 909a to the processor 903. A portion of the memory 905 may also include non-volatile random access memory (NVRAM). Instructions 907b and data 909b may also reside in the processor 903. Instructions 907b and/or data 909b loaded into the processor 903 may also include instructions 907a and/or data 909a from memory 905 that were loaded for execution or processing by the processor 903. The instructions 907b may be executed by the processor 903 to implement the methods described herein.

The gNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the gNB 960 are coupled together by a bus system 911, which may include a power bus, a control signal bus and a status signal bus, in addition to a data bus. However, for the sake of clarity, the various buses are illustrated in FIG. 9 as the bus system 911. The gNB 960 may also include a digital signal processor (DSP) 913 for use in processing signals. The gNB 960 may also include a communications interface 915 that provides user access to the functions of the gNB 960. The gNB 960 illustrated in FIG. 9 is a functional block diagram rather than a listing of specific components.

Figure 10:
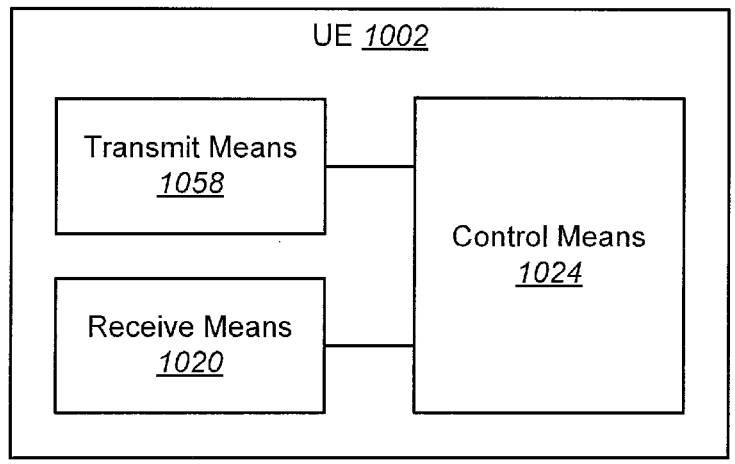
FIG. 10 is a block diagram illustrating one implementation of a UE in which one or more of the systems and/or methods described herein may be implemented.

FIG. 10 is a block diagram illustrating one implementation of a UE 1002 in which one or more of the systems and/or methods described herein may be implemented. The UE 1002 includes transmit means 1058, receive means 1020 and control means 1024. The transmit means 1058, receive means 1020 and control means 1024 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
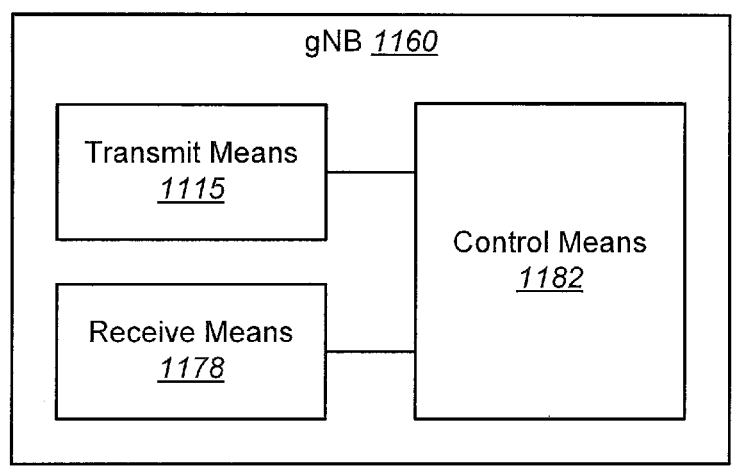
FIG. 11 is a block diagram illustrating one implementation of a gNB in which one or more of the systems and/or methods described herein may be implemented.

FIG. 11 is a block diagram illustrating one implementation of a gNB 1160 in which one or more of the systems and/or methods described herein may be implemented. The gNB 1160 includes transmit means 1117, receive means 1178 and control means 1182. The transmit means 1117, receive means 1178 and control means 1182 may be configured to perform one or more of the functions described in connection with FIG. 1 above. FIG. 9 above illustrates one example of a concrete apparatus structure of FIG. 11. Other various structures may be implemented to realize one or more of the functions of FIG. 1. For example, a DSP may be realized by software.

Figure 12:
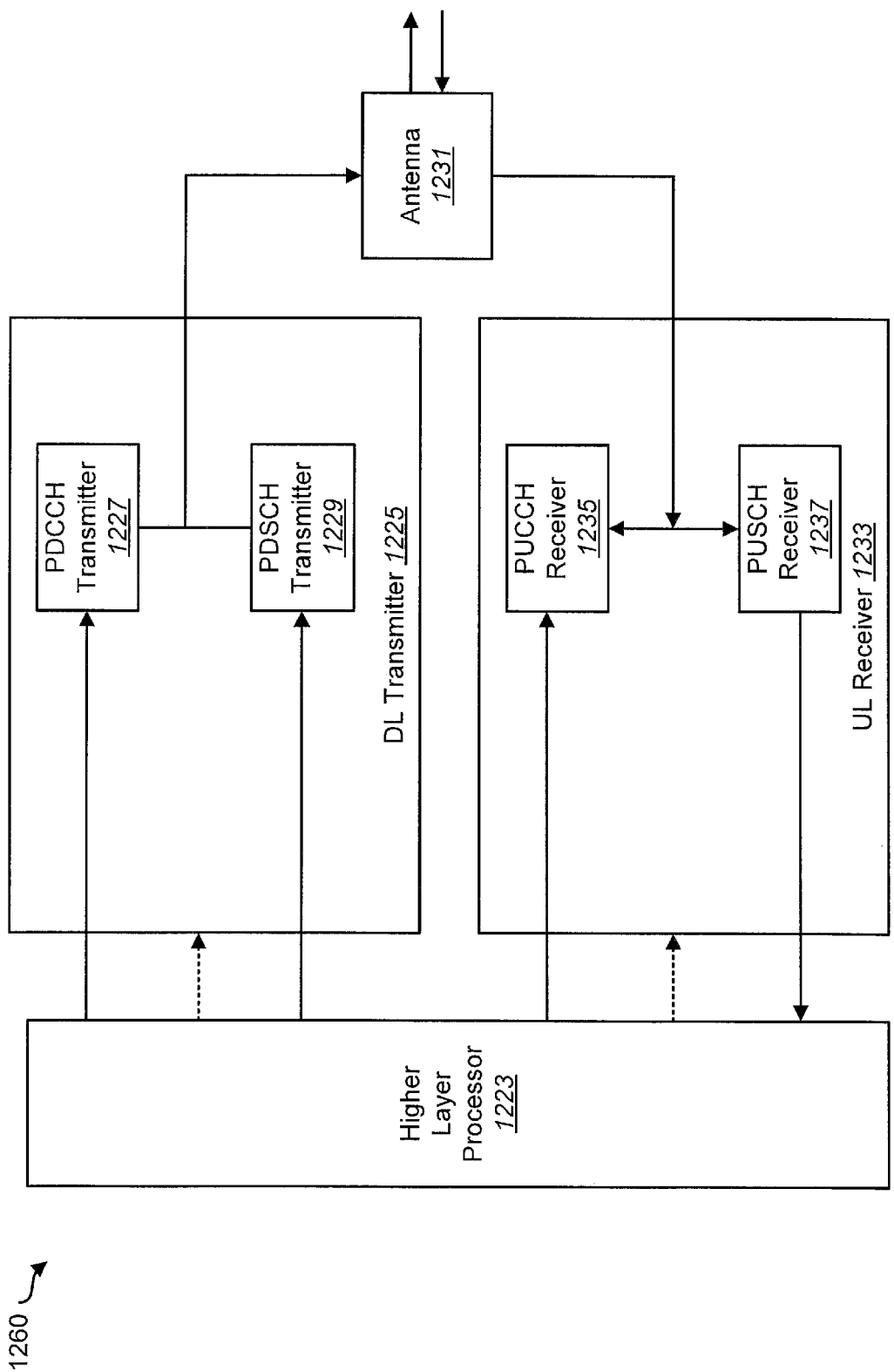
FIG. 12 is a block diagram illustrating one implementation of a gNB.

FIG. 12 is a block diagram illustrating one implementation of a gNB 1260. The gNB 1260 may be an example of the gNB 160 described in connection with FIG. 1. The gNB 1260 may include a higher layer processor 1223, a DL transmitter 1225, a UL receiver 1233, and one or more antenna 1231. The DL transmitter 1225 may include a PDCCH transmitter 1227 and a PDSCH transmitter 1229. The UL receiver 1233 may include a PUCCH receiver 1235 and a PUSCH receiver 1237.

The higher layer processor 1223 may manage physical layer's behaviors (the DL transmitter's and the UL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PDSCH transmitter transport blocks and provide the PDCCH transmitter transmission parameters related to the transport blocks.

The DL transmitter 1225 may multiplex downlink physical channels and downlink physical signals (including reservation signal) and transmit them via transmission antennas 1231. The UL receiver 1233 may receive multiplexed uplink physical channels and uplink physical signals via receiving antennas 1231 and de-multiplex them. The PUCCH receiver 1235 may provide the higher layer processor 1223 UCI. The PUSCH receiver 1237 may provide the higher layer processor 1223 received transport blocks.

Figure 13:
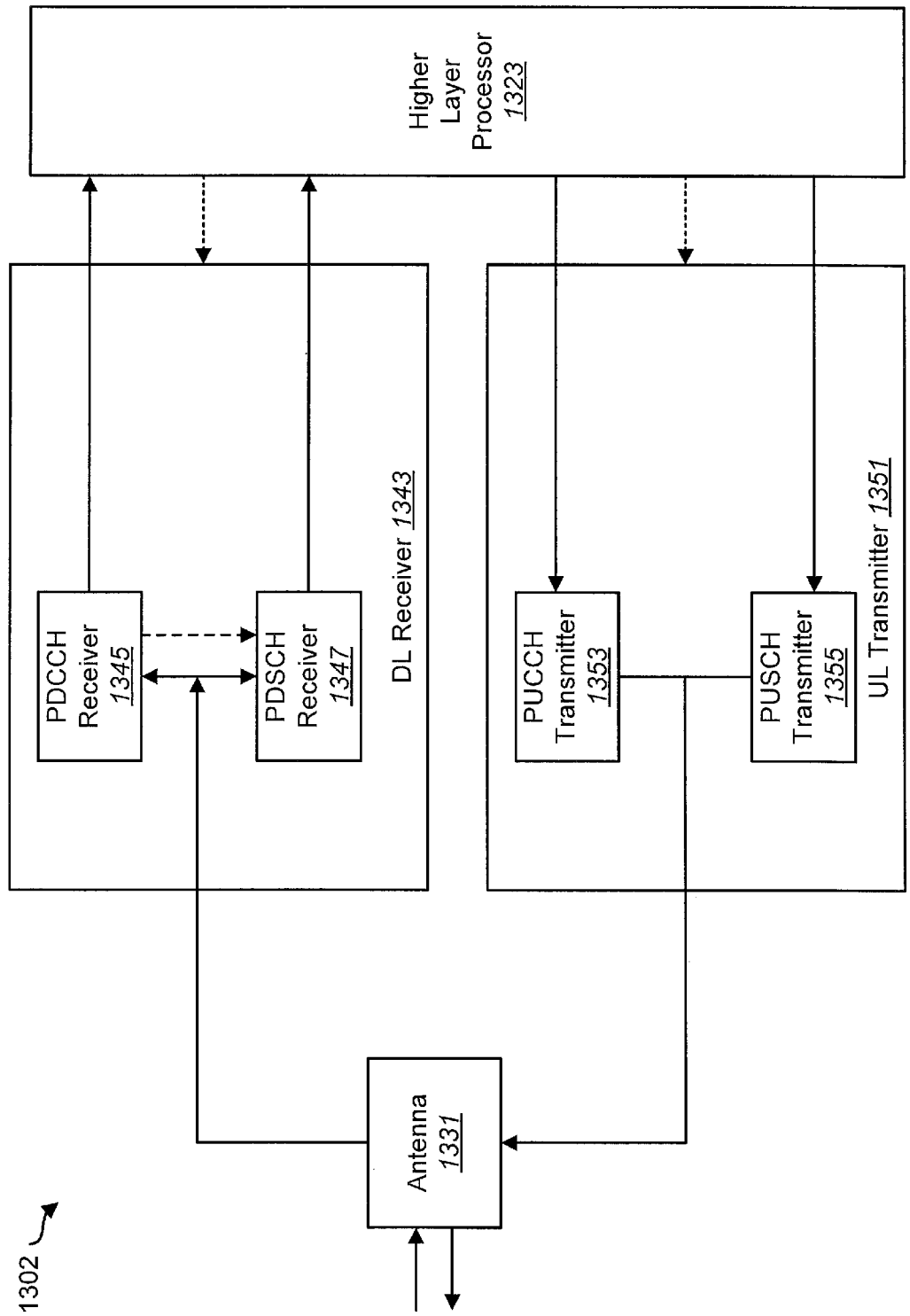
FIG. 13 is a block diagram illustrating one implementation of a UE.

FIG. 13 is a block diagram illustrating one implementation of a UE 1302. The UE 1302 may be an example of the UE 102 described in connection with FIG. 1. The UE 1302 may include a higher layer processor 1323, a UL transmitter 1351, a DL receiver 1343, and one or more antenna 1331. The UL transmitter 1351 may include a PUCCH transmitter 1353 and a PUSCH transmitter 1355. The DL receiver 1343 may include a PDCCH receiver 1345 and a PDSCH receiver 1347.

The higher layer processor 1323 may manage physical layer's behaviors (the UL transmitter's and the DL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PUSCH transmitter transport blocks and provide the PUCCH transmitter 1353 UCI.

The DL receiver 1343 may receive multiplexed downlink physical channels and downlink physical signals via receiving antennas 1331 and de-multiplex them. The PDCCH receiver 1345 may provide the higher layer processor 1323 DCI. The PDSCH receiver 1347 may provide the higher layer processor 1323 received transport blocks.

Figure 14:
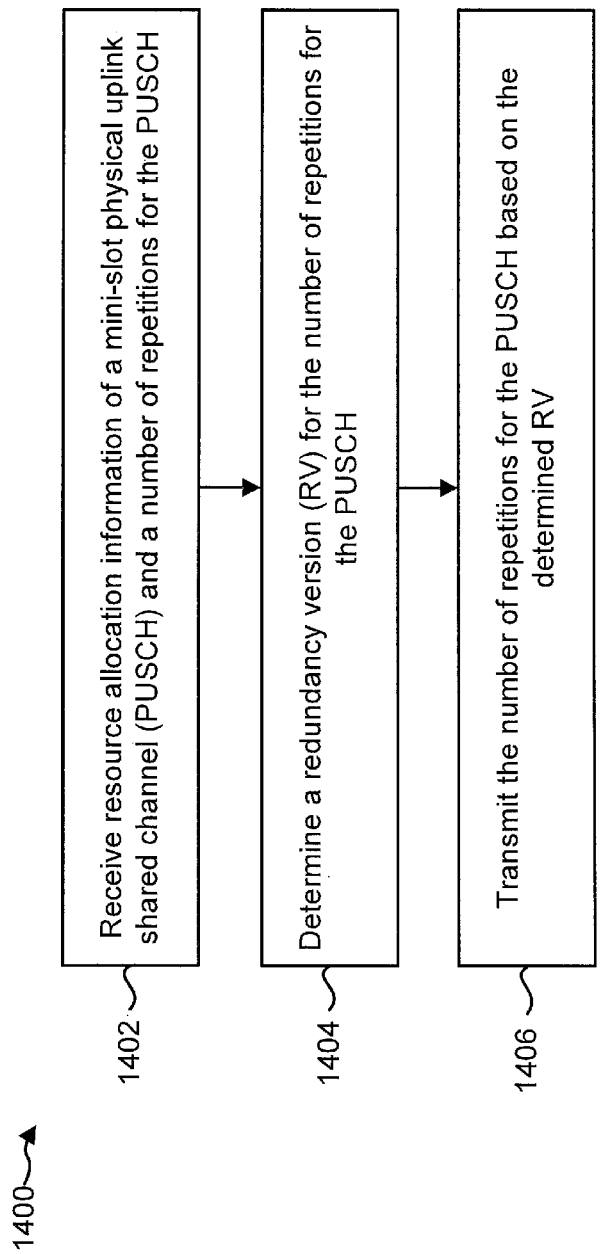
FIG. 14 is a flow diagram illustrating a communication method by a UE.

FIG. 14 is a flow diagram illustrating a communication method 1400 by a UE 102. The UE 102 may receive 1402 resource allocation information of a mini-slot physical uplink shared channel (PUSCH) and a number of repetitions for the PUSCH. The UE 102 may determine 1404 a redundancy version (RV) for the number of repetitions. The UE 102 may transmit 1406 the number of repetitions for the PUSCH based on the determined RV.

In an approach, an RV sequence may be applied to all transmission occasions of the number of repetitions including split transmission occasions. In another approach, a split transmission occasion may use a different RV pattern than non-split transmission occasions.

Figure 15:
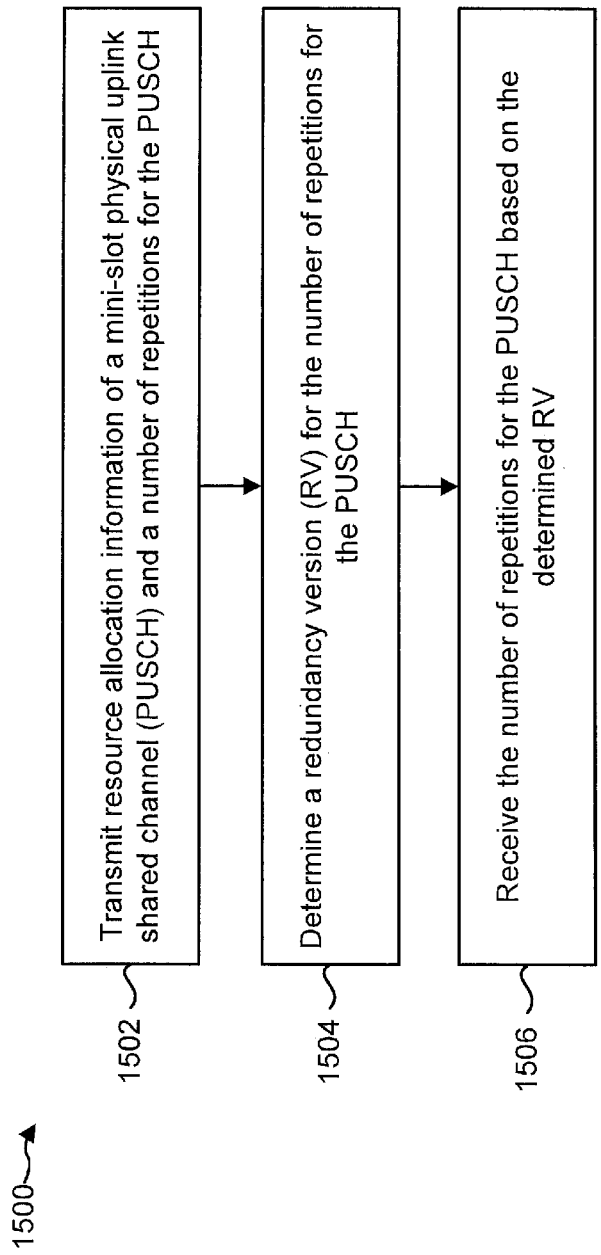
FIG. 15 is a flow diagram illustrating a communication method by a gNB.

FIG. 15 is a flow diagram illustrating a communication method 1500 by a base station apparatus (gNB) 160. The gNB 160 may transmit 1502 resource allocation information of a mini-slot physical uplink shared channel (PUSCH) and a number of repetitions for the PUSCH. The gNB 160 may determine 1504 a redundancy version (RV) for the number of repetitions. The gNB 160 may receive 1506 the number of repetitions for the PUSCH based on the determined RV.

Figure 16:
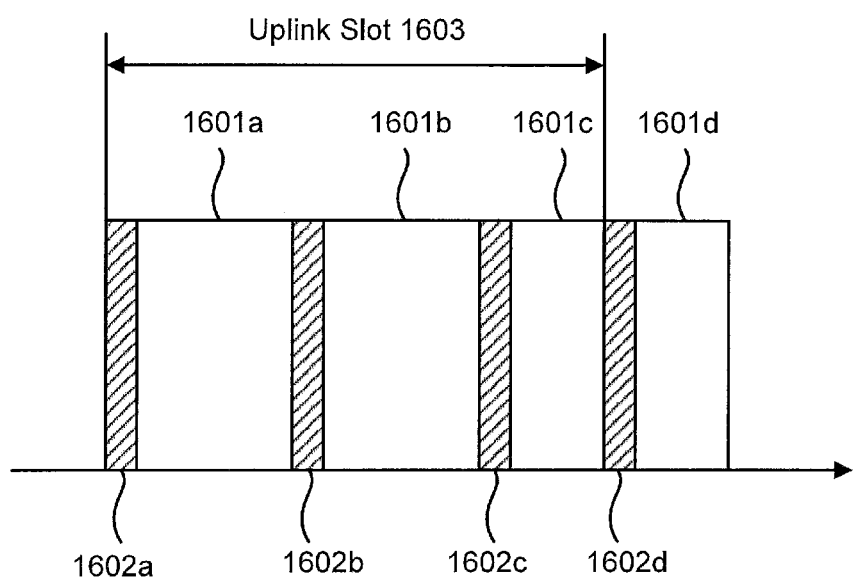
FIG. 16 illustrates an example of the mini-slot repetition and/or multi-segment transmission.

FIG. 16 illustrates an example of the mini-slot repetition and/or multi-segment transmission. FIG. 16 depicts an uplink slot 1603, four DMRSs 1602a-d and four PUSCHs 1601a-d. Mini-slot may be called PUSCH mapping type B. Within an uplink slot 1603, two mini-slots are repeated (retransmitted). In the slot boundary, two mini-slots are transmitted (repeated) across the slot (two-segment transmission).

As shown in FIG. 16, four DMRSs 1602a-d are transmitted. The UCI can be mapped around one or multiple DMRS. A UE 102 may transmit HARQ-ACK bits by mapping HARQ-ACK bits right after the earliest DMRS equal to or greater than the HARQ-ACK timing indicated by DCI or RRC signaling. For example, if the HARQ-ACK timing indicated by DCI or RRC signaling is equal to the middle of PUSCH 1601a, the UCI is mapped on the resource elements (REs) in an OFDM symbol right after DMRS 1602b. The value of the beta_offset and alpha (a) may determine the number of REs.

As described herein, some methods for the UL transmissions may be applied (e.g., specified). Here, the combination of one or more of the some methods described herein may be applied for the UL transmission. The combination of the one or more of the some methods described herein may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a micro-controller, or a state machine. The general-purpose processor or each circuit described herein may be configured by a digital circuit or may be configured by an analogue circuit. Further, when a technology of making into an As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

SUMMARY

In one example, a user equipment comprising: receiving circuitry configured to receive resource allocation information of a mini-slot physical uplink shared channel (PUSCH) and a number of repetitions for the PUSCH; control circuitry configured to determine a redundancy version (RV) for the number of repetitions for the PUSCH; and transmission circuitry configured to transmit the number of repetitions for the PUSCH based on the determined RV.

In one example, the user equipment wherein an RV sequence is applied to all transmission occasions of the number of repetitions including split transmission occasions.

In one example, the user equipment wherein a split transmission occasion uses a different RV pattern than non-split transmission occasions.

In one example, a base station apparatus comprising: transmission circuitry configured to transmit resource allocation information of a mini-slot physical uplink shared channel (PUSCH) and a number of repetitions for the PUSCH; control circuitry configured to determine a redundancy version (RV) for the number of repetitions for the PUSCH; and receiving circuitry configured to receive the number of repetitions for the PUSCH based on the determined RV.

In one example, the base station apparatus wherein an RV sequence is applied to all transmission occasions of the number of repetitions including split transmission occasions.

In one example, the base station apparatus wherein a split transmission occasion uses a different RV pattern than non-split transmission occasions.

In one example, a communication method of a user equipment comprising: receiving resource allocation information of a mini-slot physical uplink shared channel (PUSCH) and a number of repetitions for the PUSCH; determining a redundancy version (RV) for the number of repetitions for the PUSCH; and transmitting the number of repetitions for the PUSCH based on the determined RV.

In one example, a communication method of a base station apparatus comprising: transmitting resource allocation information of a mini-slot physical uplink shared channel (PUSCH) and a number of repetitions for the PUSCH; determining a redundancy version (RV) for the number of repetitions for the PUSCH; and receiving the number of repetitions for the PUSCH based on the determined RV.

In one example, a user equipment (UE) that communicates with a base station comprising: receiving circuitry configured to: receive a Radio Resource Control (RRC) message including first information indicating a first redundancy version (RV) sequence for first configured grant (CG) Physical Uplink Shared Channel (PUSCH) transmissions, receive a RRC message including second information indicating a second RV sequence for second CG PUSCH transmissions, transmitting circuitry configured to: perform repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, perform repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

In one example, a base station apparatus that communicates with a user equipment (UE) comprising: transmitting circuitry configured to: transmit a Radio Resource Control (RRC) message including first information indicating a first redundancy version (RV) sequence for first configured grant (CG) Physical Uplink Shared Channel (PUSCH) transmissions, transmit a RRC message including second information indicating a second RV sequence for second CG PUSCH transmissions, receiving circuitry configured to: receive repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, receive repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

In one example, a communication method of a user equipment comprising: receiving a Radio Resource Control (RRC) message including first information indicating a first redundancy version (RV) sequence for first configured grant (CG) Physical Uplink Shared Channel (PUSCH) transmissions, receiving a RRC message including second information indicating a second RV sequence for second CG PUSCH transmissions, transmitting circuitry configured to: performing repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, performing repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

In one example, a communication method of a base station apparatus comprising: transmitting a Radio Resource Control (RRC) message including first information indicating a first redundancy version (RV) sequence for first configured grant (CG) Physical Uplink Shared Channel (PUSCH) transmissions, transmitting a RRC message including second information indicating a second RV sequence for second CG PUSCH transmissions, receiving circuitry configured to: receiving repetitions of the first CG PUSCH transmissions based on the first information, wherein a repetition (transmission occasion) of the first CG PUSCH transmissions is split into multiple repetitions (transmission occasions) if the repetition (transmission occasion) goes across the slot boundary or downlink/uplink switching point, and RV for each actual repetition (transmission occasion) of the first CG PUSCH transmissions is determined by the first RV sequence, receiving repetitions of the second CG PUSCH transmissions based on the second information, wherein a repetition (transmission occasion) of the second CG PUSCH transmissions is split into multiple repetitions (transmission occasions) if the repetition (transmission occasion) goes across the slot boundary or downlink/uplink switching point, and RV for each actual repetition (transmission occasion) of the second CG PUSCH transmissions is determined by the second RV sequence.

The invention claimed is:

1. A user equipment (UE) that communicates with a base station comprising:
   receiving circuitry configured to:
      receive a Radio Resource Control (RRC) message including first information indicating that more than one configured grant (CG) Physical Uplink Shared Channel (PUSCH) transmission configuration is configured for the UE,
      receive a RRC message including second information indicating a first redundancy version (RV) sequence for a first CG PUSCH transmission, and
      receive a RRC message including third information indicating a second RV sequence for a second CG PUSCH transmission, and
   transmitting circuitry configured to:
      perform repetitions of the first CG PUSCH transmission based on the first second information, wherein
         a repetition (transmission occasion) of the first CG PUSCH transmission is split into multiple actual repetitions (transmission occasions) if the repetition (transmission occasion) goes across the slot boundary or downlink/uplink switching point, and
         RV for each actual repetition (transmission occasion) of the first CG PUSCH transmission is determined by the first RV sequence, and
      perform repetitions of the second CG PUSCH transmission based on the third information, wherein
         a repetition (transmission occasion) of the second CG PUSCH transmission is split into multiple actual repetitions (transmission occasions) if the repetition (transmission occasion) goes across the slot boundary or downlink/uplink switching point, and
         RV for each actual repetition (transmission occasion) of the second CG PUSCH transmission is determined by the second RV sequence.

2. A base station apparatus that communicates with a user equipment (UE) comprising:
   transmitting circuitry configured to:
      transmit a Radio Resource Control (RRC) message including first information indicating that more than one configured grant (CG) Physical Uplink Shared Channel (PUSCH) transmission configuration is configured for the UE,
      transmit a RRC message including second information indicating a first redundancy version (RV) sequence for a first CG PUSCH transmission, and
      transmit a RRC message including third information indicating a second RV sequence for a second CG PUSCH transmission, and
   receiving circuitry configured to:
      receive repetitions of the first CG PUSCH transmission based on the second information, wherein
         a repetition (transmission occasion) of the first CG PUSCH transmission is split into multiple actual repetitions (transmission occasions) if the repetition (transmission occasion) goes across the slot boundary or downlink/uplink switching point, and
         RV for each actual repetition (transmission occasion) of the first CG PUSCH transmission is determined by the first RV sequence, and
      receive repetitions of the second CG PUSCH transmission based on the third information, wherein
         a repetition (transmission occasion) of the second CG PUSCH transmission is split into multiple actual repetitions (transmission occasions) if the repetition (transmission occasion) goes across the slot boundary or downlink/uplink switching point, and
         RV for each actual repetition (transmission occasion) of the second CG PUSCH transmission is determined by the second RV sequence.

3. A communication method of a user equipment (UE) comprising:
   receiving a Radio Resource Control (RRC) message including first information indicating that more than one configured grant (CG) Physical Uplink Shared Channel (PUSCH) transmission configuration is configured for the UE,
   receiving a RRC message including second information indicating a first redundancy version (RV) sequence for a first CG PUSCH transmission,
   receiving a RRC message including third information indicating a second RV sequence for a second CG PUSCH transmission,
   transmitting repetitions of the first CG PUSCH transmission based on the second information, wherein
      a repetition (transmission occasion) of the first CG PUSCH transmission is split into multiple actual repetitions (transmission occasions) if the repetition (transmission occasion) goes across the slot boundary or downlink/uplink switching point, and
      RV for each actual repetition (transmission occasion) of the first CG PUSCH transmission is determined by the first RV sequence, and
   transmitting repetitions of the second CG PUSCH transmission based on the third information, wherein a repetition (transmission occasion) of the second CG PUSCH transmission is split into multiple actual repetitions (transmission occasions) if the repetition (transmission occasion) goes across the slot boundary or downlink/uplink switching point, and RV for each actual repetition (transmission occasion) of the second CG PUSCH transmission is determined by the second RV sequence.

\* \* \* \* \*